(12) United States Patent
Pampaloni et al.

(10) Patent No.: US 11,872,548 B2
(45) Date of Patent: Jan. 16, 2024

(54) OXO-NITROGENATED IRON COMPLEX, CATALYTIC SYSTEM COMPRISING SAID OXO-NITROGENATED IRON COMPLEX AND PROCESS FOR THE (CO)POLYMERIZATION OF CONJUGATED DIENES

(71) Applicant: Versalis S.p.A., San Donato Milanese (IT)

(72) Inventors: Guido Pampaloni, Pontedera (IT); Anna Sommazzi, Novara (IT); Giovanni Ricci, Parma (IT); Francesco Masi, S. Angelo Lodigiano (IT); Giuseppe Leone, Milan (IT)

(73) Assignee: Versalis S.p.A., San Donato Milanese (IT)

( * ) Notice: Subject to any disclaimer, the term of this patent is extended or adjusted under 35 U.S.C. 154(b) by 30 days.

(21) Appl. No.: 17/204,570

(22) Filed: Mar. 17, 2021

(65) Prior Publication Data

US 2021/0245145 A1 Aug. 12, 2021

Related U.S. Application Data

(62) Division of application No. 16/300,597, filed as application No. PCT/IB2017/053142 on May 29, 2017, now abandoned.

(30) Foreign Application Priority Data

May 30, 2016 (IT) ........................ 102016000055704

(51) Int. Cl.
*C07F 15/06* (2006.01)
*B01J 31/20* (2006.01)
(Continued)

(52) U.S. Cl.
CPC ................. *B01J 31/20* (2013.01); *C08F 4/52* (2013.01); *C08F 4/7008* (2013.01);
(Continued)

(58) Field of Classification Search
None
See application file for complete search history.

(56) References Cited

U.S. PATENT DOCUMENTS 5,128,295 A 7/1992 Porri et al.
5,258,475 A 11/1993 Kissin
(Continued)

FOREIGN PATENT DOCUMENTS

CN 104854084 A 8/2015
EP 0277003 A1 8/1988
(Continued)

OTHER PUBLICATIONS

International Search Report and Written Opinion for PCT/IB2017/053142, dated Aug. 23, 2017, 10 pages.
(Continued)

*Primary Examiner* — Yun Qian
(74) *Attorney, Agent, or Firm* — Praedcere Law

(57) ABSTRACT

An oxo-nitrogenated iron complex having general formula (I) or (II) wherein: $R_1$ and $R_2$ identical or different, represent a hydrogen atom; or are selected from linear or branched, optionally halogenated $C_1$-$C_{20}$, preferably $C_1$-$C_{15}$, alkyl groups, optionally substituted cycloalkyl groups, optionally substituted aryl groups; $R_3$, identical or different, represent a hydrogen atom; or are selected from linear or branched, optionally halogenated $C_1$-$C_{20}$, preferably $C_1$-$C_{15}$, alkyl groups, optionally substituted cycloalkyl groups, optionally substituted aryl groups; $X_1$ and $X_2$, identical or different, represent a halogen atom such as, for example, chlorine,
(Continued)

bromine, iodine; or are selected from linear or branched $C_1$-$C_{20}$, preferably $C_1$-$C_{15}$, alkyl groups, —$OCOR_4$ groups or —$OR_4$ groups wherein $R_4$ is selected from linear or branched $C_1$-$C_{20}$, preferably $C_1$-$C_{15}$, alkyl groups. Said oxo-nitrogenated iron complex having general formula (I) or (II) can be advantageously used in a catalytic system for the (co)polymerization of conjugated dienes.

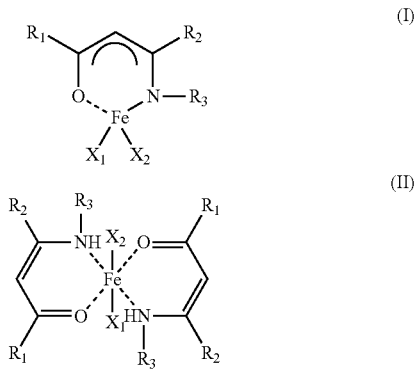

11 Claims, 29 Drawing Sheets

(51) Int. Cl.
  *C08F 4/52* (2006.01)
  *C08F 4/70* (2006.01)
  *C08F 36/06* (2006.01)
  *C08F 36/08* (2006.01)

(52) U.S. Cl.
  CPC ............ *C08F 4/7083* (2013.01); *C08F 36/06* (2013.01); *C08F 36/08* (2013.01); *B01J 2531/31* (2013.01); *B01J 2531/842* (2013.01); *B01J 2531/847* (2013.01)

(56) References Cited

U.S. PATENT DOCUMENTS

| | | | |
|---|---|---|---|
| 6,160,063 A | 12/2000 | Luo | |
| 6,180,734 B1 | 1/2001 | Luo | |
| 6,211,313 B1 | 4/2001 | Luo | |
| 6,277,779 B1 | 8/2001 | Luo | |
| 6,284,702 B1 | 9/2001 | Luo | |
| 6,388,030 B2 | 5/2002 | Luo | |
| 2007/0161761 A1* | 7/2007 | Green | C07F 15/065 526/341 |
| 2015/0329577 A1* | 11/2015 | Sommazzi | C08F 36/06 526/172 |

FOREIGN PATENT DOCUMENTS

| | | |
|---|---|---|
| EP | 0418044 A2 | 3/1991 |
| EP | 0421659 A1 | 4/1991 |
| EP | 0427697 A2 | 5/1991 |
| EP | 0495375 A2 | 7/1992 |
| EP | 0520732 A1 | 12/1992 |
| EP | 2935206 B1 | 10/2015 |
| WO | WO9200333 A2 | 1/1992 |
| WO | WO9205208 A1 | 4/1992 |
| WO | WO2004081020 A1 | 9/2004 |
| WO | WO201106151 A1 | 5/2011 |

OTHER PUBLICATIONS

Database CA [Online] Chemical Abstracts Service, Columbus Ohio, US; Sakayori, Takafumi et al "Radical polymerization reaction of styrene-based monomers catalyzed by iron complexes bearing .beta.-aminoketonato ligand", XP002763775, retrieved from STN Database accession No. 2015: 940732 abstract.
Takeuchi et al, "New Industrial Polymers", American Chemical Society Symposium Series, 1974, vol. 4, pp. 15-25.
Halasa et al, Kirk-Othmer Encyclopedia of Chemical Technology, 1989, 4th Edition, Kroschwitz J.I. Ed., John Wiley and Sons, New York, vol. 8, pp. 1031-1045.
TATE eta l, "Encyclopedia of Polymer Science and Engineering", 1989, 2nd Edition, Mark H.F. Ed/, John Wiley and Sons, New YOrk, vol. 2, pp. 537-590.
Kerns et al, "Butadiene Polymers", in Encyclopedia of Polymer Science and Technology, 2003, Mark H.F. Ed., Wiley, vol. 5, pp. 317-356.
Porri et al "Comprehensive Polymer Science", 1989, Eastmond G.C. et al Eds., Pergamon Press, Oxford UK, vol. 4, Part II, p. 53-108.
Thiele et al, "Macromolecular Science. Part C: Polymer Reviews", 2003, C43, pp. 581-628.
Osakada et al,"Advanced Polymer Science", 2004, vol. 171, pp. 137-194.
Friebe et al, "Advanced Polymer Science", 2006, vol. 204, pp. 1-154.
Zhang et al , "Journal of Molecular Catalysis", 1982, vol. 17, Issue 1, pp. 65-76.
Bazzini et al, "Macromolecular Rapid Communications", 2002, vol. 23(15), pp. 922-927.
Bazzini et al, "Polymer Communication", 2004, vol. 45, pp. 2871-2875.
Ricci et al, "Journal of Molecular Catalysis A: Chemical", 2003, vol. 204-205, pp. 287-293.
Ricci et al, "Coordination Chemistry Reviews", 2010, vol. 254, Issues 5-6, pp. 661-676.
Nakayama et al., "Macromolecules", 2003, vol. 36(21), pp. 7953-7958.
Gong et al, "Polymer", 2009, vol. 50, pp. 5980-5986.
Gong et al, "Polymer", 2009, vol. 50, pp. 6259-6264.
Gong et al, "Inorganic Chimica Acta", 2011, vol. 373, Issue 1, pp. 47-53.
Gong et al, "Journal of Organometallic Chemistry", 2012, vol. 702, pp. 10-18.
Zhang et al, "Dalton Transactions", 2012, vol. 41, pp. 9639-9645.
Raynaud et al, "Angewandte Chemie International Edition", 2012, vol. 51, pp. 11805-11808.
Wang et al, "Polymer", 2013, vol. 54, pp. 5174-5181.
Liu et al, "Journal of Molecular Catalysis A: Chemical", 2014, vol. 391, pp. 25-35.
Gong et al, "Journal of Molecular Catalysis A: Chemical", 2015, vol. 406, pp. 78-84.
Zheng et al, "Journal of Polymer Science Part A: Polymer Chemistry", 2015, vol. 53, Issue 10, pp. 1182-1188.
Parks et al, "Inorganic Chemistry", 1968, vol. 7(7), pp. 1408-1416.
Roberts et al, "Journal of Chemical Society", 1927, pp. 1832-1857.
Dudek et al, "Journal of the American Chemical Society", 1961, vol. 83, Issue 9, pp. 2099-2104.
Johnson et al, "Journal of the American Chemical Society", 1995, vol. 117, pp. 6414-6415.
Van Koten et al, "Advances in Organometallic Chemistry", 1982, vol. 21, pp. 151-239.
"IUPAC Periodic Table of the Elements", version dated Jun. 1, 2012, available on the following website: www.iupac.org/fileadmin/user_upload/news/IUPAC_Periodic_Table-1Jun12.pdf.
Beck et al, "Chemical Reviews", 1988, vol. 88, pp. 1405-1421.
Strauss, "Chemical Reviews", 1993, vol. 93, pp. 927-942.
Calderazzo et al, "Comptes Rendus Academie des Sciences", 1999, t. 2, Serie 11 c, pp. 311-319.
Mochel, "Journal of Polymer Science Part A-1: Polymer Chemistry", 1972, vol. 10, Issue 4, pp. 1009-1018.
Sato et al,"Journal of Polymer Science: Polymer Chemistry Edition", 1979, vol. 17, Issue 11, pp. 3551-3558.

(56) References Cited

OTHER PUBLICATIONS

Office Action issued by CNIPA for Chinese patent application 201780026611.5, dated Jun. 28, 2020, 18 pages (English translation provided).
Gupta et al, "Mononuclear iron(III)macrocyclic complexes derived from 4-methyl-2,6-di(formyl/benzoyl)phenol and diamines: synthesis, spectral speciation, and electrochemical behavior", Polyhedron, 20, 15-16, Jun. 30, 2001, pp. 2019-2025.
O'Reilly et al, "Design of Highly Active Iron-based catalysts for Atom-Transfer Radical Polymerization: Tridentate Salicylaldiminato Ligands Affording Near Ideal Nemstian Behavior", American Chemical Society, 125, 28, Jun. 21, 2003, pp. 8450-8451.
Wei, Book of Organic Chemical Materials (vol. 1), Chemical Industry Press, Jan. 1999, pp. 432-433.
First Examination report issued by Indian patent office (IPI) for Indian patent application No. 201817041380, dated Oct. 20, 2020, 5 pages (English translation is provided within document).
Sakayori et al, "Radical polymerization reaction of styrene-based monomers catalyzed by iron complexes bearing .beta.-aminoketonato ligand", Kobunshi Ronbunshu (2015), 72 (5), pp. 306-317 (English translation provided).

\* cited by examiner

OXO-NITROGENATED IRON COMPLEX, CATALYTIC SYSTEM COMPRISING SAID OXO-NITROGENATED IRON COMPLEX AND PROCESS FOR THE (CO)POLYMERIZATION OF CONJUGATED DIENES

The present invention relates to an oxo-nitrogenated iron complex.

More particularly, the present invention relates to an oxo-nitrogenated iron complex and to its use in a catalytic system for the (co)polymerization of conjugated dienes.

The present invention also relates to a catalytic system for the (co)polymerization of conjugated dienes comprising said oxo-nitrogenated iron complex.

Furthermore, the present invention relates to a (co)polymerization process of conjugated dienes, in particular, to a process for the polymerization of 1-3-butadiene or isoprene, characterized in that it uses said catalytic system.

It is known that the stereospecific (co)polymerization of conjugated dienes is a very important process in the chemical industry in order to obtain products that are among the most widely used rubbers.

It is also known that among the different polymers that can be obtained from the stereospecific polymerization of 1,3-butadiene (i.e. 1,4-cis, 1,4-trans, 1,2 syndiotactic, 1,2 isotactic, 1,2 atactic, mixed structure 1,4-cis/1,2 having a variable 1,2 unit content), only 1,4-cis polybutadiene and 1,2 syndiotactic polybutadiene are industrially produced and commercially available. Further details on said polymers can be found, for example, in: Takeuchi Y. et al., "*New Industrial Polymers*", "*American Chemical Society Symposium Series*" (1974), Vol. 4, pg. 15-25; Halasa A F. et al., "*Kirk-Othmer Encyclopedia of Chemical Technology*" (1989), 4$^{th}$ Ed., Kroschwitz J. I. Ed., John Wiley and Sons, New York, Vol. 8, pg. 1031-1045; Tate D. et al., "*Encyclopedia of Polymer Science and Engineering* (1989), 2$^{nd}$ Ed., Mark H. F. Ed., John Wiley and Sons, New York, Vol. 2, pg. 537-590; Kerns M. et al., "*Butadiene Polymers*", in "*Encyclopedia of Polymer Science and Technology*" (2003), Mark H. F. Ed., Wiley, Vol. 5, pg. 317-356.

Generally, 1,4-cis polybutadiene is prepared through polymerization processes that use different catalytic systems comprising catalysts based on titanium (Ti), cobalt (Co), nickel (Ni), neodymium (Nd). Catalytic systems comprising cobalt based catalysts have high catalytic activity and stereospecificity and can be considered the most versatile of those mentioned above since, when by changing their formulation, they are able to provide all the possible stereoisomers of polybutadiene mentioned above, as described, for example, in: Porri L. et al., "*Comprehensive Polymer Science*" (1989), Eastmond G. C. et al. Eds., Pergamon Press, Oxford, UK, Vol. 4, Part II, pg. 53-108; Thiele S. K. H. et al., "*Macromolecular Science. Part C: Polymer Reviews*" (2003), C43, pg. 581-628; Osakada, K. et al., "*Advanced Polymer Science*" (2004), Vol. 171, pg. 137-194; Friebe L et al., "*Advanced Polymer Science*" (2006), Vol. 204, pg. 1-154.

Iron (Fe) based catalysts have also been studied which are useful in the (co)polymerization of conjugated dienes. One of the first studies in literature on catalytic systems comprising iron (Fe) based catalysts concerned the (co)polymerization of 1,3-butadiene and isoprene with catalytic systems comprising iron acetylacetonate [Fe(acac)$_3$], tri-iso-butyl-aluminum (TIBA) and 1,10-phenanthroline (phen) as described, for example, in Zhang Z. Y. et al., "*Journal of Molecular Catalysis*" (1982), Vol. 17, Issue 1, pg. 65-76. Said catalytic system is able to provide a binary polybutadiene with a mixed 1,4-cis/1,2 structure having an equal content of 1,4-cis and 1,2 units. The active species in said catalytic system is likely to be constituted, as suggested by the authors, by an iron (II) complex [Fe(II)] formed by the reduction of iron acetylacetonate [Fe(acac)$_3$] through reaction with tri-iso-butyl-aluminum (TIBA), said iron (II) complex [Fe(II)] containing 1,10-phenanthroline (phen) as a ligand.

U.S. Pat. No. 6,160,063 describes a catalytic system obtained by combination or by reaction of: a compound containing iron (e.g., iron carboxylate, iron β-diketonate, iron alkoxide, iron arylalkoxide); an organic compound of magnesium; and a cyclic hydrogen phosphite. The aforementioned catalytic system is particularly useful for the polymerization of 1,3-butadiene for providing binary polybutadiene with a mixed 1,4-cis/1,2 structure. U.S. Pat. No. 6,180,734 describes a catalytic system obtained by combination or by reaction of: a compound containing iron (e.g., iron carboxylate, iron β-diketonate, iron alkoxide, iron arylalkoxide); cyclic hydrogen phosphite; and an organic compound of aluminum. The aforementioned catalytic system is particularly useful for the polymerization of 1,3-butadiene for providing 1,2 syndiotactic polybutadiene.

U.S. Pat. No. 6,211,313 describes a catalytic system obtained by combination or by reaction of: a compound containing iron (e.g., iron carboxylate, iron β-diketonate, iron alkoxide, iron arylalkoxide); cyclic hydrogen phosphite; and an aluminoxane. The aforementioned catalytic system is particularly useful for the polymerization of 1,3-butadiene for providing 1,2 syndiotactic polybutadiene.

U.S. Pat. No. 6,277,779 describes a catalytic system obtained by combination or by reaction of: a compound containing iron (e.g., iron carboxylate, iron β-diketonate, iron alkoxide, iron arylalkoxide); a dihydrocarbyl hydrogen phosphite; and an organic compound of aluminum. The aforementioned catalytic system is particularly useful for the polymerization of 1,3-butadiene for providing 1,2 syndiotactic polybutadiene having a melting point that can vary between 100° C. and 200° C., according to the components and the ratios between the different components present in said catalytic system.

U.S. Pat. Nos. 6,284,702 and 6,388,030 describe a catalytic system obtained by combination or by reaction of: a compound containing iron (e.g., iron carboxylate, iron ft diketonate, iron alkoxide, iron arylalkoxide); an organic compound of magnesium; and a dihydrocarbyl hydrogen phosphite. The aforementioned catalytic system is particularly useful for the polymerization of 1,3-butadiene for providing 1,2 syndiotactic polybutadiene having a melting point that can vary between 100° C. and 190° C., according to the components and the ratios between the different components present in said catalytic system.

Catalytic systems comprising, for example, iron diethyl bis(2,2'-bipyridine) [(Bipy)$_2$FeEt$_2$] and methylaluminoxane (MAO), or comprising various iron dichloride (FeCl$_2$) complexes with bidentate aromatic amines (e.g., N,N,N',N'-tetramethylethylenediamine (tmeda), N,N'-dimethylethylenediamine (dmeda), 2,2-bipyridine (bipy), 1,10-phenanthroline (phen), and compounds of aluminum [e.g., aluminum alkyls (AlR$_3$ wherein R is ethyl, iso-butyl), methylaluminoxane (MAO)], are extremely active in the (co) polymerization of conjugated dienes, as described, for example, in international patent application WO 02/102861; or in Bazzini C. et al., "*Macromolecular Rapid Communications*" (2002), Vol. 23(15), pg. 922-927; Bazzini C. et al., "*Polymer Communication*" (2004), Vol. 45, pg. 2871-2875;

Ricci G. et al., "*Journal of Molecular Catalysis A: Chemical*" (2003), Vol. 204-205, pg. 287-293; Ricci G. et al., "*Coordination Chemistry Reviews*" (2010), Vol. 254, Issues 5-6, pg. 661-676. Such catalytic systems are able to provide polybutadienes with a prevalently 1,2 structure; in particular, the polybutadienes obtained at low temperatures have an approximately 90% 1,2 structure and a 50% syndiotactic pentade structure, and the 1,2 unit and syndiotactic pentade contents are reduced as the polymerization temperature increases. Furthermore, the polybutadienes obtained with the aforementioned catalytic systems have a very high weight-average molecular weight ($M_w$) and a rather restricted polydispersion index (PDI) corresponding to the ratio $M_w/M_n$ ($M_n$=number-average molecular weight) e.g., ranging from 1 to 2, indicating a "pseudo-living" nature of said catalytic systems which are indicated as "single site". A significant effect of the nature of the amine ligand on the catalytic activity of said catalytic systems has also been observed: in particular, the catalytic activity is reduced as the steric size of the ligand increases. Furthermore, the type of aluminum compound can also affect the catalytic activity: in feet, it has been observed that when methylaluminoxane (MAO) is used, there is an increase in the 1,2 unit content under the same polymerization conditions. Furthermore, the aforementioned catalytic systems were shown to be extremely active and selective not only in the polymerization of 1,3-butadiene but also in the (co)polymerization of other conjugated dienes such as, for example, isoprene, 2,3-dimethyl-1,3-butadiene, 3-methyl-1,3-pentadiene, providing (co)polymers with different structures such as, for example, syndiotactic 3,4 polyisoprene, 1,4-cis poly(2,3-dimethyl-1,3-butadiene), syndiotactic E-1,2-poly(3-methyl-1,3-pentadiene).

Catalytic systems comprising iron ter-pyridine complexes [e.g., $FeCl_3$(ter-pyridine)], in combination with appropriate alkylating agents, are useful in the stereospecific polymerization of conjugated dienes: said catalytic systems show discrete catalytic activity and are able to provide polybutadienes with a 1,4-trans structure as described, for example, in Nakayama Y. et al., "*Macromolecules*" (2003), Vol. 36(21), pg. 7953-7958. Catalytic systems obtained through the combination of iron (III) carboxylates (e.g., iron (III) 2-ethylhexanoate [Fe(2-EHA)$_3$]Fe(III) with aluminum tri-iso-butyl (Al$^i$Bu$_3$) in hexane, in the presence of phosphates (e.g., triethylphosphate) are able to polymerize 1,3-butadiene to polybutadiene with a prevalently 1,2 structure and with a high degree of syndiotacticity as described, for example, in Gong D. et al., "*Polymer*" (2009), Vol. 50, pg. 5980-5986.

Catalytic systems comprising complexes obtained from iron trichloride (FeCl$_3$) or from iron dichloride tetrahydrate (FeCl$_2$.4H$_2$O) with substituted 2,6-bis[1-(iminophenyl)ethyl]pyridine or 2,6-bis(imino)pyridine, in the presence of methylaluminoxane (MAO), are able to provide high 1,4-trans structure (>90%), or 1,4-cis/1,4-trans mixed structure polybutadienes, as a function of the catalytic system used as described, for example, in Gong D. et al., "*Polymer*" (2009), Vol. 50, pg. 6259-6264; Gong D. et al., "*Inorganic Chimica Acta*" (2011), Vol. 373, Issue 1, pg. 47-53. Catalytic systems comprising complexes obtained from iron trichloride (FeCl$_3$) or from iron dichloride tetrahydrate (FeCl$_2$.4H$_2$O) with substituted 2,6-bis[1-(2-benzimidazolyl)]pyridine or 2,6-bis(pyrazol)pyridine, in the presence of modified methylaluminoxane (MMAO) or diethylaluminum chloride (AlEt$_2$Cl), are able to provide polybutadienes with a different structure, i.e. 1,4-trans or 1,4-cis, as a function of the catalytic system used as described, for example, in Gong D. et al., "*Journal of Organometallic Chemistry*" (2012), Vol. 702, pg. 10-18.

Bis-imine complexes of iron (II) [Fe(II)] with pincer ligands in combination with aluminum alkyl [for example, tri-methylaluminum (AlMe$_3$) are able to provide polybutadienes with an essentially 1,4-cis structure (≥70%) as described, for example, in Zhang J. et al., "*Dalton Transactions*" (2012), Vol. 41, pg. 9639-9645.

Catalytic systems comprising bis-imine-pyridine complexes of iron, aluminum alkyls (e.g., AlR$_3$ wherein R is ethyl, Iso-butyl), and boron salts, are able to polymerize isoprene to polyisoprene with a high 1,4-trans structure as described, for example, in Raynaud J. et al., "*Angewandte Chemie International Edition*" (2012), Vol. 51, pg. 11805-11808. Catalytic systems comprising iron (II) complexes with substituted 2-pyrazolyl-1,10-phenanthroline and aluminum alkyls (e.g., AlR$_3$ wherein R is ethyl, iso-butyl, octyl), are characterized by a high and selective catalytic level and are able to provide polybutadienes with a high 1,4-trans structure as described, for example, in Wang B. et al., "*Polymer*" (2013), Vol. 54, pg. 5174-5181.

Catalytic systems comprising iron (II) complexes with 2-(N arylcarboxyimidoylchloride)quinoline and aluminum alkyls [e.g., AlR$_3$ wherein R Is ethyl, iso-butyl; or methylaluminoxane (MAO)], are characterized by low catalytic activity and are able to provide polybutadienes with a high 1,4-cis structure as described, for example, in Liu H. et al., "*Journal of Molecular Catalysis A: Chemical*" (2014), Vol. 391, pg. 25-35.

Catalytic systems comprising iron (II) complexes with 2,6-bis(dimethyl-2-oxazoline-2-yl)pyridine and aluminum alkyls [e.g., AlR$_3$ wherein R is ethyl, iso-butyl; or methylaluminoxane (MAO)], are able to provide polybutadienes with a mixed 1,4-cis/1,4-trans structure as described, for example, in Gong D. et al., "*Journal of Molecular Catalysis A Chemical*" (2015), Vol. 406, pg. 78-84.

Finally, polybutadienes with "soft/hard" stereoblocks, with a mixed 1,4-cis/1,2 structure were obtained using the catalytic system 2-ethylhexanoate of iron/tri-iso-butylaluminum/diethyl phosphate [Fe(2-EHA)$_3$/Al$^i$Bu$_3$/DEP], appropriately varying the aluminum/iron (Al/Fe) ratio as described, for example, in Zheng W. et al., "*Journal of Polymer Science Part A: Polymer Chemistry*" (2015), Vol. 53, Issue 10, pg. 1182-1188. Since (co)polymers of conjugated dienes, in particular polybutadiene and polyisoprene, can be advantageously used for producing tires, in particular for tire treads, as well as in the footwear industry (e.g., for producing soles for shoes), the study of new catalytic systems able to provide said (co)polymers is still of great interest.

The Applicant has considered the problem of finding a new oxo-nitrogens ted iron complex to be used in a catalytic system able to provide (co)polymers of conjugated dienes, such as, for example, linear or branched polybutadiene or linear or branched polyisoprene, with a mixed structure, in particular, polybutadiene with a prevalent 1,4-tis and 1,2 unit content (i.e. having a content of 1,4-cis and 1,2 units ≥90%, preferably equal to 100%), and polyisoprene with a prevalent content of 1,4-cis and 3,4 units (i.e. having a content of 1,4-cis and 3,4 units ≥90%, preferably equal to 100%).

The Applicant has now found a new oxo-nitrogenated Iron complex having general formula (I) or (II) below defined, able to provide (co)polymers of conjugated dienes, such as, for example, linear or branched polybutadiene or polyisoprene, with a mixed structure, in particular, polybutadiene with a prevalent 1,4-cis and 1,2 unit content (i.e. having a content of 1,4-cis and 1,2 units ≥90%, preferably equal to 100%), and polyisoprene with a prevalent content of 1,4-cis and 3,4 units (i.e. having a content of 1,4-cis and 3,4 units ≥90%, preferably equal to 100%).

Therefore, the subject matter of the present invention is an oxo-nitrogenated iron complex having general formula (I) or (II):

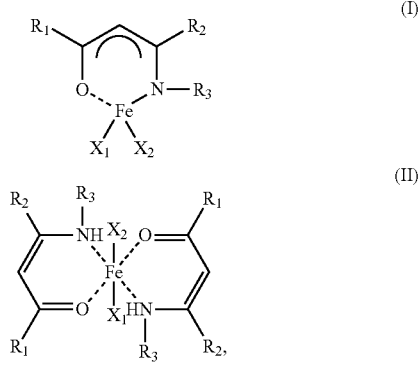

wherein:
- $R_1$ and $R_2$, identical or different, represent a hydrogen atom; or are selected from linear or branched, optionally halogenated $C_1$-$C_{20}$, preferably $C_1$-$C_{15}$, alkyl groups, optionally substituted cycloalkyl groups, optionally substituted aryl groups;
- $R_3$, identical or different, represent a hydrogen atom; or are selected from linear or branched, optionally halogenated $C_1$-$C_{20}$, preferably $C_1$-$C_{15}$, alkyl groups, optionally substituted cycloalkyl groups, optionally substituted aryl groups;
- $X_1$ and $X_2$, identical or different, represent a halogen atom such as, for example, chlorine, bromine, Iodine; or are selected from linear or branched $C_1$-$C_{20}$, preferably $C_1$-$C_{15}$, alkyl groups, —$OCOR_4$ groups or —$OR_4$ groups wherein $R_4$ is selected from linear or branched $C_1$-$C_{20}$, preferably $C_1$-$C_{15}$, alkyl groups.

For the purpose of the present description and of the following claims, the definitions of the numeric ranges always include the extremes unless otherwise specified.

For the purpose of the present description and of the following claims, the term "comprising" also includes the terms "which essentially consists of" or "which consists of".

For the purpose of the present description and of the following claims, the term "$C_1$-$C_{20}$ alkyl groups" means alkyl groups having from 1 to 20 carbon atoms, linear or branched. Specific examples of $C_1$-$C_{20}$ alkyl groups are: methyl, ethyl, n-propyl, iso-propyl, n-butyl, s-butyl, iso-butyl, tert-butyl, pentyl, hexyl, heptyl, octyl, n-nonyl, n-decyl, 2-butyloctyl, 5-methylhexyl, 4-ethylhexyl, 2-ethylheptyl, 2-ethylhexyl.

For the purpose of the present description and of the following claims, the term "optionally halogenated $C_1$-$C_{20}$ alkyl groups" means alkyl groups having from 1 to 20 carbon atoms, linear or branched, saturated or unsaturated, wherein at least one of the hydrogen atoms is substituted with a halogen atom such as, for example, fluorine, chlorine, bromine, preferably fluorine, chlorine. Specific examples of $C_1$-$C_{20}$ alkyl groups optionally containing halogenated are: fluoromethyl, difluoromethyl, trifluoromethyl, trichloromethyl, 2,2,2-trifluoroethyl, 2,2,2-trichloroethyl, 2,2,3,3-tetrafluoropropyl, 2,2,3,3,3-pentafluoropropyl, perfluoropentyl, perfluorooctyl, perfluorodecyl.

For the purpose of the present description and of the following claims, the term "cycloalkyl groups" means cycloalkyl groups having from 3 to 30 carbon atoms. Said cycloalkyl groups can be optionally substituted with one or more groups, identical or different, selected from: halogen atoms; hydroxyl groups, $C_1$-$C_{12}$ alkyl groups; $C_1$-$C_{12}$ alkoxy groups; cyano groups; amino groups; nitro groups. Specific examples of cycloalkyl groups are: cyclopropyl, 2,2-difluorocyclopropyl, cyclobutyl, cyclopentyl, cyclohexyl, hexamethylcyclohexyl, pentamethylcyclopentyl, 2-cyclooctylethyl, methylcyclohexyl, methoxycyclohexyl, fluorocyclohexyl, phenylcyclohexyl.

For the purpose of the present description and of the following claims, the term "aryl groups" means carbocyclic aromatic groups. Said carbocylic aromatic groups can be optionally substituted with one or more groups, identical or different selected from: halogen atoms such as, for example, fluorine, chlorine, bromine; hydroxyl groups, $C_1$-$C_{12}$ alkyl groups; $C_1$-$C_{12}$ alkoxy groups; cyano groups; amino groups; nitro groups. Specific examples of aryl groups are: phenyl, 2-methylphenyl, 4-methylphenyl, 2,4,6-trimethylphenyl, 2,6-di-iso-propylphenyl, methoxyphenyl, hydroxyphenyl, phenyloxyphenyl, fluorophenyl, pentafluorophenyl, chlorophenyl, bromophenyl, nitrophenyl, dimethylaminophenyl, naphthyl, phenylnaphthyl, phenanthrene, anthracene.

In accordance with a preferred embodiment of the present invention, in said oxo-nitrogenated iron complex having general formula (I) or (II):
- $R_1$ and $R_2$, mutually identical, are selected from linear or branched $C_1$-$C_{20}$ alkyl groups, preferably are a methyl group;
- $R_3$, mutually identical, are selected from aryl groups optionally substituted with linear or branched $C_1$-$C_{20}$, alkyl groups, preferably with one or more methyl, ethyl, tert-butyl or iso-propyl groups, preferably are a phenyl group, 2-methylphenyl, 4-methylphenyl, 2,4,6-trimethylphenyl, 2,6-di-iso-propylphenyl;
- $X_1$ and $X_2$, mutually identical, are a halogen atom such as, for example, chlorine, bromine, iodine, preferably chlorine.

The oxo-nitrogenated iron complex having general formula (I) or (II) can be considered, in accordance with the present invention, under any physical form such as, for example, the isolated and purified solid form, the form solvated with an appropriate solvent, or the one supported on suitable organic or inorganic solids, preferably having a granular or powdered physical form.

The oxo-nitrogenated iron complex having general formula (I) or (II) is prepared starting from ligands known in the prior art.

Specific examples of ligands useful for the purpose of the present invention are those having the following formulae (L1)-(L5):

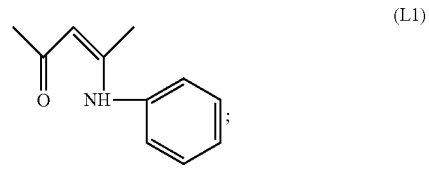

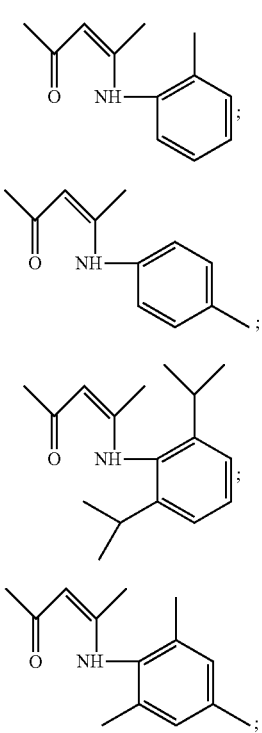

Said ligands having formulae (L1)-(L5), can be prepared through processes known in the prior art. For example, said ligands having formulae (L1)-(L5) can be prepared through condensation reactions between primary amines and diketones as described, for example, in international patent application WO 2013/037911 in the name of the Applicant; or by Parks J. E. and Holm R. H. in "*Inorganic Chemistry*" (1968), Vol 7(7), pg. 1408-1416; Roberts E and Turner E. E. in "*Journal of Chemical Society*" (1927), pg. 1832-1857; Dudek G. O. and Holm R. H. in "*Journal of the American Chemical Society*" (1961), Vol. 83, Issue 9, pg. 2099-2104. More details on the process for the preparation of said ligands having formulae (L1)-(L5) can be found in the following examples.

The oxo-nitrogenated iron complex having general formula (I) or (II) can be prepared according to processes known in the prior art. For example, said oxo-nitrogenated iron complex can be prepared by reaction between iron compounds having general formula $Fe(X)_2$ or $Fe(X)_3$ wherein X is a halogen atom such as, for example, chlorine, bromine, iodine, preferably chlorine, as it is or complexed with ethers [e.g., diethylether, tetrahydrofuran (THF), dimethoxyethane], or with water, with the ligands having formulae (L1)-(L5) reported above, in molar ratio ligand (L)/iron (Fe) ranging from 1 to 2 operating, preferably, in the presence of at least one solvent which can be selected, for example, from: chlorinated solvents (e.g., methylene chloride), ether solvents, [e.g., tetrahydrofuran (THF)], alcoholic solvents (e.g., butanol), hydrocarbon solvents (e.g., hexane), or mixtures thereof, at ambient temperature or higher. In the case of an oxo-nitrogenated iron complex having general formula (I), said ligands having formulae (L1)-(L5), prior to the reaction with the aforementioned iron compounds having general formula $Fe(X)_2$ or $Fe(X)_3$ wherein X has the meanings mentioned above, can be made to react with a solution of an alkyllithium (e.g., n-butyllithium) in a hydrocarbon solvent (e.g., hexane). The oxo-nitrogenated iron complex thus obtained can be subsequently recovered through known methods such as, evaporation of the solvent (e.g., under vacuum), followed by solubilization in an appropriate solvent subsequent filtration (e.g., on Celite®) followed by drying (e.g., under vacuum). More details on the process for the preparation of said oxo-nitrogenated iron complex having general formula (I) or (II) can be found in the following examples.

For the purpose of the present description and of the following claims the expression "ambient temperature" means a temperature ranging from 20° C. to 25° C.

As mentioned above, the present invention also relates to a catalytic system for the (co)polymerization of conjugated dienes comprising said oxo-nitrogenated iron complex having general formula (I) or (II).

Therefore, the present Invention also relates to a catalytic system for the (co)polymerization of conjugated dienes comprising:

(a) at least one oxo-nitrogenated iron complex having general formula (I) or (II);
(b) at least one co-catalyst selected from organic compounds of an element M' different from carbon, said element M' being selected from elements belonging to groups 2,12,13, or 14 of the Periodic Table of the Elements, preferably from: boron, aluminum, zinc, magnesium, gallium, tin, more preferably aluminum, boron.

In general, the formation of the catalytic system comprising the oxo-nitrogenated iron complex having general formula (I) or (II) and the co-catalyst (b), is preferably performed in an inert liquid medium, more preferably in a hydrocarbon solvent. The choice of the oxo-nitrogenated iron complex having general formula (I) or (II) and of the co-catalyst (b), as well as the particular methodology used, can vary according to the molecular structures and to the desired result, according to what is similarly reported in relevant literature accessible to an expert skilled in the art for other transition metal complexes with imine ligands, as reported, for example, by L. K. Johnson et al., in "*Journal of the American Chemical Society*" (1995), Vol. 117, pg. 6414-6415, and by G. van Koten et al., in "*Advances in Organometallic Chemistry*" (1982), Vol. 21, pg. 151-239.

In accordance with a further preferred embodiment of the present invention, said co-catalyst (b) can be selected from ($b_1$) aluminum alkyls having general formula (III):

$$Al(X')_n(R_5)_{3-n} \qquad (III)$$

wherein X' represents a halogen atom such as, for example, chlorine, bromine, iodine, fluorine; $R_6$ is selected from linear or branched $C_1$-$C_{20}$ alkyl groups, cycloalkyl groups, aryl groups, said groups being optionally substituted with one or more atoms of silicon or germanium; and n is an integer ranging from 0 to 2.

In accordance with a further preferred embodiment of the present invention, said co-catalyst (b) can be selected from ($b_2$) organo-oxygenated compounds of an element M' different from carbon belonging to groups 13 or 14 of the Periodic Table of the Elements, preferably organo-oxygenated compounds of aluminum, gallium, tin. Said organo-oxygenated compounds ($b_2$) can be defined as organic compounds of M', wherein the latter is bonded to at least one oxygen atom and to at least one organic group comprising an alkyl group having from 1 to 6 carbon atoms, preferably methyl, in accordance with a further preferred embodiment of the present invention, said co-catalyst (b) can be selected from ($b_3$) compounds or mixtures of organometallic compounds of an element M' different from carbon able to react with the oxo-nitrogenated iron complex having general formula (I) or (II) by extracting from it a σ-linked substituent $X_1$ or $X_2$, to form on the one hand at least one neutral compound and, on the other hand, an ionic compound consisting of a cation containing the metal (Fe) coordinated by the ligand, and a non-coordinating organic anion containing the metal M whose negative charge is delocalized on a multicentric structure.

It is to be noted that for the purpose of the present invention and of the following claims, the term "Periodic Table of the Elements" refers to the "IUPAC Periodic Table of the Elements", version dated 1 Jun. 2012, available on the following website: www.iupac.org/fileadmin/user_upload/news/IUPAC_Periodic_Table-1Jun12.pdf.

Specific examples of aluminum alkyls having general formula (III) particularly useful for the purpose of the present invention are: tri-methyl-aluminum, tri-(2,3,3-tri-methyl-butyl)-aluminum, tri-(2,3-di-methyl-hexyl)-aluminum, tri-(2,3-di-methyl-butyl)-aluminum, tri-(2,3-di-methyl-pentyl)-aluminum, tri-(2,3-di-methyl-heptyl)-aluminum, tri-(2-methyl-3-ethyl-pentyl)-aluminum, tri-(2-methyl-3-ethyl-hexyl)-aluminum, tri-(2-methyl-3-ethyl-heptyl)-aluminum, tri-(2-methyl-3-propyl-hexyl)-aluminum, tri-ethyl-aluminum, tri-(2-ethyl-3-methyl-butyl)-aluminum, tri-(2-ethyl-3-methyl-pentyl)-aluminum, tri-(2,3-di-ethyl-pentyl-aluminum), tri-n-propyl-aluminum, tri-iso-propyl-aluminum, tri-(2-propyl-3-methyl-butyl)-aluminum, tri-(2-iso-propyl-3-methyl-butyl)-aluminum, tri-n-butyl-aluminum, tri-iso-butyl-aluminum (TIBA), tri-tert-butyl-aluminum, tri-(2-iso-butyl-3-methyl-pentyl)-aluminum, tri-(2,3,3-tri-methyl-pentyl)-aluminum, tri-(2,3,3-tri-methyl-hexyl)-aluminum, tri-(2-ethyl-3,3-di-methyl-butyl)-aluminum, tri-(2-ethyl-3,3-di-methyl-pentyl)-aluminum, tri-(2-iso-propyl-3,3-dimethyl-butyl)-aluminum, tri-(2-tri-methylsilyl-propyl)-aluminum, tri-2-methyl-3-phenyl-butyl)-aluminum, tri-(2-ethyl-3-phenyl-butyl)-aluminum, tri-(2,3-di-methyl-3-phenyl-butyl)-aluminum, tri-(2-phenyl-propyl)-aluminum, tri-[2-(4-fluoro-phenyl)-propyl]-aluminum, tri-(2-(4-chloro-phenyl)-propyn-aluminum, tri-[2-(3-iso-propyl-phenyl-tri-(2-phenyl-butyl)-aluminum, tri-(3-methyl-2-phenyl-butyl)-aluminum, tri-(2-phenyl-pentyl)-aluminum, tri-[2-(penta-fluoro-phenyl)-propyl]-aluminum, tri-(2,2-di-phenyl-ethyl]-aluminum, tri-(2-phenyl-methyl-propyl]-aluminum, tri-pentyl-aluminum, tri-hexyl-aluminum, tri-cyclo hexyl-aluminum, tri-octyl-aluminum, di-ethyl-aluminum hydride, di-n-propyl-aluminum hydride, di-n-butyl-aluminum hydride, di-iso-butyl-aluminum hydride (DIBAH), di-hexyl-aluminum hydride, di-iso-hexyl-aluminum hydride, di-octyl-aluminum hydride, di-iso-octyl-aluminum hydride, ethyl-aluminum di-hydride, n-propyl-aluminum di-hydride, iso-butyl-aluminum di-hydride, di-ethyl-aluminum chloride (DEAC), mono-ethyl-aluminum dichloride (EADC), di-methyl-aluminum chloride, di-iso-butyl-aluminum chloride, iso-butyl-aluminum dichloride, ethyl-aluminum-sesquichloride (EASC), as well as the corresponding compounds wherein one of the hydrocarbon substituents is substituted by a hydrogen atom and those wherein one or two of the hydrocarbon substituents are substituted with aniso-butyl group. Di-ethyl-aluminum chloride (DEAC), mono-ethyl-aluminum dichloride (EADC), ethylaluminum-sesquichloride (EASC), are particularly preferred.

Preferably, when used for the formation of a catalytic (co)polymerization system in accordance with the present invention, the aluminum alkyls having general formula (III) can be placed in contact with an oxo-nitrogenated iron complex having general formula (I) or (II), in proportions such that the molar ratio between the aluminum contained in the aluminum alkyls having general formula (III) and the iron contained in the oxo-nitrogenated iron complex having general formula (I) or (II) can be ranging from 5 to 5000, preferably ranging from 10 to 1000. The sequence with which the oxo-nitrogenated iron complex having general formula (I) or (II) and the aluminum alkyl having general formula (III) are placed in contact with each other is not particularly critical.

Further details on aluminum alkyls having general formula (III) can be found in international patent application WO 2011/061151.

In accordance with a particularly preferred embodiment, said organo-oxygenated compounds ($b_2$) can be selected from the aluminoxanes having general formula (IV):

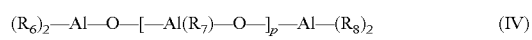

$$(R_6)_2-Al-O-[-Al(R_7)-O-]_p-Al-(R_8)_2 \quad (IV)$$

wherein $R_6$, $R_7$ and $R_8$, identical or different, represent a hydrogen atom, a halogen atom such as, for example, chlorine, bromine, Iodine, fluorine; or are selected from $C_1$-$C_{20}$ alkyl groups, linear or branched, cycloalkyl groups, aryl groups, said groups being optionally substituted with one or more atoms of silicon or germanium; and p is an integer ranging from 0 to 1000.

As is known, aluminoxanes are compounds containing Al—O—Al bonds, with a variable O/Al ratio, obtainable according to processes known in the prior art such as, for example, by reaction, in controlled conditions, of an aluminum alkyl, or of an aluminum alkyl halogenide, with water, or with other compounds containing predetermined quantities of available water such as, for example, in the case of the reaction of aluminum trimethyl with aluminum sulfate hexahydrate, copper sulfate pentahydrate, or iron sulfate pentahydrate.

Said aluminoxanes and, in particular, methylaluminoxane (MAO), are compounds that can be obtained through known organometallic chemical processes such as, for example, by adding trimethyl aluminum to a suspension in aluminum sulfate hexahydrate. Preferably, when used for the formation of a catalytic (co)polymerization system in accordance with the present invention, the aluminoxanes having general formula (IV) can be placed in contact with an oxo-nitrogenated iron complex having general formula (I) or (II), in proportions such that the molar ratio between the aluminum (Al) contained in the aluminoxane having general formula (IV) and the iron contained in the oxo-nitrogenated iron complex having general formula (I) or (II) is ranging from 10 to 10000, preferably ranging from 100 to 5000. The sequence with which the oxo-nitrogenated Iran complex having general formula (I) or (II) and the aluminoxane having general formula (IV) are placed in contact with each other is not particularly critical.

As well as the aforementioned preferred aluminoxanes having general formula (IV), the definition of the compound ($b_2$) in accordance with the present invention also includes galloxanes wherein, in the general formula (IV), gallium is contained in the place of aluminum and stannoxanes wherein, in the general formula (IV), tin is contained in the place of aluminum, whose use as co-catalysts for the polymerization of olefins in the presence of metallocene complexes is known. Further details in relation to said galloxanes and stannoxanes can be found, for example, in the U.S. Pat. Nos. 5,128,295 and 5,258,475.

Specific examples of aluminoxanes having general formula (IV) particularly useful for the purpose of the present invention are: methylaluminoxane (MAO), ethyl-aluminoxane, n-butyl-aluminoxane, tetra-iso-butyl-aluminoxane (TIBAO), tert-butyl-aluminoxane, tetra-(2,4,4-tri-methyl-pentyl)-aluminoxane (TIOAO), tetra-(2,3-di-methyl-butyl)-aluminoxane (TDMBAO), tetra-(2,3,3-tri-methyl-butyl)-aluminoxane (TTMBAO). Methylaluminoxane (MAO) is particularly preferred.

Further details on aluminoxanes having general formula (IV) can be found in international patent application WO 2011/061151.

In accordance with a preferred embodiment of the present invention, said compounds or mixtures of compounds ($b_3$) can be selected from organic compounds of aluminum and especially of boron, such as, for example, those represented by the following general formulae:

$$[(R_C)_w H_{4-w}] \cdot [B(R_D)_4]^-; B(R_D)_3; Al(R_D)_3; B(R_D)_3 Pyr; [Ph_3C]^+ \cdot [B(R_D)_4]^-;$$

$$[(R_C)_3 PyrH]^+ \cdot [B(R_D)_4]^-;$$

$$[Li]^+ \cdot [B(R_D)_4]^-; [Li]^+ \cdot [Al(R_D)_4]^-$$

wherein w is an integer ranging from 0 to 3, each $R_C$ group independently represents an alkyl group or an aryl group having from 1 to 10 carbon atoms and each $R_D$ group Independently represents an aryl group partially or totally, preferably totally, fluorinated, having from 6 to 20 carbon atoms, Pyr Is a pyrrole radical, optionally substituted. Preferably, when used for the formation of a catalytic (co) polymerization system in accordance with the present invention, the compounds or mixtures of compounds ($b_3$) can be placed in contact with an oxo-nitrogenated iron complex having general formula (I) or (II), in proportions such that the molar ratio between the metal (M') contained in the compounds or mixtures of compounds ($b_3$) and the iron contained in the oxo-nitrogenated iron complex having general formula (I) or (II) is ranging from 0.1 to 15, preferably ranging from 0.5 to 10, more preferably ranging from 1 to 6. The sequence with which the oxo-nitrogenated iron complex having general formula (I) or (II) and the compound or mixture of compounds ($b_3$) are placed in contact with each other is not particularly critical.

Said compounds or mixtures of compounds ($b_3$), especially in the case wherein $X_1$ and $X_2$ in the oxo-nitrogenated iron complex having general formula (I) or (II) are different from alkyl, must be used in combination with an aluminoxane having general formula (IV) such as, for example, methylaluminoxane (MAO), or, preferably, with an aluminum alkyl having general formula (III), more preferably a trialkylaluminum having from 1 to 8 carbon atoms in each alkyl residue, such as, for example, tri-methyl-aluminum, tri-ethyl-aluminum, tri-iso-butylaluminum (TIBA).

Examples of the methodologies generally used for the formation of a catalytic (co)polymerization system in accordance with the present invention, in the case of using compounds or mixtures of compounds ($b_3$), are qualitatively schematized in the list reported below, which does not however limit the overall scope of the present invention:

($m_1$) contact of an oxo-nitrogenated iron complex having general formula (I) or (II) wherein at least one from $X_1$ and $X_2$ is an alkyl group, with at least one compound or a mixture of compounds ($b_3$) whose cation is able to react with said alkyl group to form a neutral compound, and whose anion is voluminous, non-coordinating and able to delocalize the negative charge;

($m_2$) reaction of an oxo-nitrogenated iron complex having general formula (I) or (II) with at least one aluminum alkyl having general formula (III), preferably a trialkylaluminum, used in excess molar ratio from 10/1 to 300/1, followed by the reaction with a strong Lewis acid, such as, for example, tris(pentafluorophenyl)boron [compound ($b_3$)], in almost stoichiometric quantities or in slight excess with respect to the iron (Fe);

($m_3$) contact and reaction of an oxo-nitrogenated iron complex having general formula (I) or (II) with an excess molar ratio from 10/1 to 1000/1, preferably from 100/1 to 500/1 of at least a trialkylaluminum or an alkyl aluminum halogenide that can be represented with the formula $AlR'''_m Z_{3-m}$ wherein R''' is a $C_1$-$C_8$ alkyl group, linear or branched, or a mixture thereof, Z is a halogen, preferably chlorine or bromine, and m is a decimal number ranging from 1 to 3, followed by the addition to the composition thus obtained of at least one compound or mixture of compounds ($b_3$) in quantities such that the ratio between said compound or mixture of compounds ($b_3$) or the aluminum of said compound or mixture of compounds ($b_3$) and the iron of the oxo-nitrogenated iron complex having general formula (I) or (II) is ranging from 0.1 to 15, preferably from 1 to 6.

Examples of compounds or mixtures of compounds ($b_3$) able to produce an ionic catalytic system by reaction with an oxo-nitrogenated iron complex having general formula (I) or (II) according to the present invention are described, although with reference to the formation of ionic metallocene complexes, in the following publications, whose contents is incorporated herein for reference purposes:

W. Beck et al., "*Chemical Reviews*" (1988), Vol. 88, pg. 1405-1421;

S. H. Stares, "*Chemical Reviews*" (1993), Vol. 93, pg. 927-942;

european patent applications EP 277 003, EP 495 375, EP 520 732, EP 427 697, EP421 659, EP 418044;

published international patent applications WO 92/00333, WO 92/05208.

Specific examples of compounds or mixtures of compounds ($b_3$) particularly useful for the purpose of the present invention are: tributylammonium-tetrakis-pentafluorophenyl-borate, tributylammonium-tetrakis-pentafluorophenyl-aluminate, tributylammonium-tetrakis-[(3,5-di-(trifluorophenyl)]-borate, tributylammonium-tetrakis-(4-fluorophenyl)]-borate, N,N-dimethylbenzylammonium-tetrakis-pentafluoro-phenyl-borate, N,N-dimethyl-hexylammonium-tetrakis-pentafluorophenyl-borate, N,N-dimethylanilinium-tetrakis-(pentafluorophenyl)-borate, N,N-dimethylanilinium-tetrakis-(pentafluorophenyl)-aluminate, di-(propyl)-ammonium-tetrakis-(pentafluorophenyl)-borate, di-(cyclohexyl)-ammonium-tetrakis-(pentafluorophenyl)-borate, tri-phenyl-carbenium-tetrakis-(pentafluorophenyl)-borate, tri-phenylcarbenium-tetrakis-(penta-fluorophenyl)-aluminate, tris(pentafluorophenyl) boron, tris(pentafluorophenyl)-aluminum, or mixtures thereof. Tetrakis-pentafluorophenyl-borates are preferred.

For the purpose of the present description and of the following claims, the terms "mole" and "molar ratio" are used both with reference to compounds consisting of molecules and with reference to atoms and ions, omitting for the latter ones the terms gram atom or atomic ratio, even if they are scientifically more accurate.

For the purpose of the present invention, other additives or components can potentially be added to the aforementioned catalytic system so as to adapt it to satisfy specific practical requirements. The catalytic systems thus obtained can therefore be considered included within the scope of the present invention. Additives and/or components that can be added in the preparation and/or formulation of the catalytic system according to the present invention are, for example: inert solvents, such as, for example, aliphatic and/or aromatic hydrocarbons; aliphatic and/or aromatic ethers; weakly coordinating additives (e.g., Lewis bases) selected, for example, from non-polymerizable olefins; sterically hindered or electronically poor ethers; halogenating agents such as, for example, silicon halides, halogenated hydrocarbons, preferably chlorinated; or mixtures thereof.

Said catalytic system can be prepared, as already reported above, according to methods known in the prior art.

For example, said catalytic system can be prepared separately (preformed) and subsequently introduced into the (co)polymerization environment. On this point said catalytic system can be prepared by making at least one oxo-nitrogenated iron complex (a) having general formula (I) or (II) react with at least one co-catalyst (b), possibly in presence of other additives or components selected from those cited above, in the presence of a solvent such as, for example, toluene, heptane, at a temperature ranging from 20° C. to 60° C., for a time ranging from 10 seconds to 10 hours, preferably ranging from 30 seconds to 5 hours. Further details on the preparation of said catalytic system can be found in the examples reported below.

Alternatively, said catalytic system can be prepared in situ, i.e. directly in the (co)polymerization environment. On that point said catalytic system can be prepared by separately introducing the oxo-nitrogenated iron complex (a) having general formula (I) or (II), the co-catalyst (b) and the pre-selected conjugated diene(s) to be (co)polymerized, operating at the conditions wherein the (co)polymerization is performed. For the purpose of the present invention, the aforementioned catalytic systems can also be supported on inert solids, preferably constituted by silicon and/or aluminum oxides, such as, for example, silica, alumina or silico-aluminates. For supporting said catalytic systems the known supporting techniques can be used, generally comprising contact, in a suitable inert liquid medium, between the support, optionally activated by heating to temperatures over 200° C., and one or both components (a) and (b) of the catalytic system according to the present invention. It is not necessary, for the purposes of the present invention, for both components to be supported, since only the oxo-nitrogenated iron complex (a) having general formula (I) or (II), or the co-catalyst (b) can be present on the support surface. In the latter case, the missing component on the surface is subsequently placed in contact with the supported component when the active catalyst is to be formed by polymerization.

The scope of the present invention also includes the oxo-nitrogenated iron complex having general formula (I) or (II), and the catalytic systems based thereon, which are supported on a solid through the functionalization of the latter and the formation of a covalent bond between the solid and the oxo-nitrogenated iron complex having general formula (I) or (II).

Furthermore, the present invention relates to a (co)polymerization process of conjugated dienes, characterized in that it uses said catalytic system.

The quantity of oxo-nitrogenated Iron complex (a) having general formula (I) or (II) and of co-catalyst (b) which can be used in the (co)polymerization of conjugated dienes varies according to the (co)polymerization process to be performed. Said quantity is however such as to obtain a molar ratio between the iron contained in the oxo-nitrogenated iron complex having general formula (I) or (II) and the metal contained in the co-catalyst (b), e.g., aluminum in the case wherein the co-catalyst (b) is selected from the aluminum alkyls ($b_1$) or from the aluminoxanes ($b_2$), boron in the case wherein the co-catalyst (b) is selected from the compounds or mixtures of compounds ($b_3$) having general formula (IV), comprised between the values reported above.

Specific examples of conjugated dienes that can be (co)polymerized using the catalytic system in accordance with the present invention are: 1,3-butadiene, 2-methyl-1,3-butadiene (isoprene), 2,3-dimethyl-1,3-butadiene, 1,3-pentadiene, 1,3-hexadiene, cyclo-1,3-hexadiene. Preferred (co)polymerizable conjugated dienes are 1,3-butadiene, isoprene. The aforementioned (co)polymerizable conjugated dienes can be used alone, or in a mixture of two or more dienes. In this latter case, i.e. using a mixture of two or more dienes, a copolymer will be obtained.

In accordance with a particularly preferred embodiment, the present invention relates to a polymerization process of 1,3-butadiene or isoprene, characterized in that it uses said catalytic system.

Generally, said (co)polymerization can be performed in the presence of a polymerization solvent, generally selected from inert organic solvents, such as, for example: saturated aliphatic hydrocarbons such as, for example, butane, pentane, hexane, heptane, or mixtures thereof; saturated cyclo-aliphatic hydrocarbons such as, for example, cyclopentane, cyclohexane, or mixtures thereof; mono-olefins such as, for example, 1-butene, 2-butene, or mixtures thereof; aromatic hydrocarbons such as, for example, benzene, toluene, xylene, or mixtures thereof; halogenated hydrocarbons such as, for example, methylene chloride, chloroform, carbon tetrachloride, trichloroethylene, perchloroethylene, 1,2-dichloroethane, chlorobenzene, bromobenzene, chlorotoluene, or mixtures thereof. Preferably the (co)polymerization solvent is selected from saturated aliphatic hydrocarbons.

Alternatively, said (co)polymerization can be performed using as a (co)polymerization solvent the same conjugated diene(s) that must be (co)polymerized, in accordance with the process known as "bulk process".

Generally, the concentration of the conjugated diene to be (co)polymerized in said (co)polymerization solvent is ranging from 5% by weight to 50% by weight, preferably ranging from 10% by weight to 20% by weight, with respect to the total weight of the conjugated diene mixture and inert organic solvent.

Generally, said (co)polymerization can be performed at a temperature ranging from −70° C. to +100° C., preferably ranging from −20° C. to +80° C.

With regard to pressure, it is preferable to operate at the pressure of the components of the mixture to be (co)polymerized.

Said (co)polymerization can be performed both continuously and batchwise.

As mentioned above, said process allows (co)polymers of conjugated dienes to be obtained, such as, polybutadiene, polyisoprene, in particular polybutadiene, linear or branched, with a mixed structure, in particular, polybutadiene with a prevalent 1,4-cis and 1,2 unit content (i.e. having a content of 1,4-cis and 1,2 units ≥90%, preferably equal to 100%), and polyisoprene with a prevalent content of 1,4-cis and 3,4 units (i.e. having a content of 1,4-cis and 3,4 units ≥90%, preferably equal to 100%).

For the purpose of better understanding the present invention and to put it into practice, below are some illustrative and non-limiting examples thereof.

EXAMPLES

Reagents and Materials

The list below reports the reagents and materials used in the following examples of the invention, any optional pre-treatments thereof and their manufacturer iron powder (Fe) (Aldrich): purity 99%, used as it is;

iron trichloride ($FeCl_3$) (Aldrich): purity 99.9%, used as it is;
iron dichloride ($FeCl_2$) (Aldrich): purity 97%, used as it is;
tetrahydrofuran (THF) (Aldrich): used as it is;
iron dichloride:tetrahydrofuran complex (1:1.5) [$FeCl_2$(THF)$_{1.5}$] (Aldrich): prepared from iron powder (Fe) and iron trichloride ($FeCl_2$), in tetrahydrofuran (THF) hot, according to the method specified in Calderazzo F. et al., in "*Comptes Rendus Académie des Sciences*" (1999), t. 2, Série II c, pg. 311-319;
iron dichloride tetrahydrate ($FeCl_2.4H_2O$) (Aldrich): purity 96%, used as it is;
methylaluminoxane (MAO) (toluene solution 10% by weight) (Crompton): used as it is;
2,4-pentanedione (Aldrich): used as it is;
benzene (Aldrich): pure, ≥99.9%, distilled over sodium (Na) in an inert atmosphere;
aniline (Aldrich): distilled at reduced pressure and stored in an inert atmosphere;
hydrochloric add in 37% aqueous solution (Aldrich): used as it is;
o-toluidine (Aldrich): distilled at reduced pressure and stored in an inert atmosphere;
p-toluidine (Aldrich): distilled at reduced pressure and stored in an inert atmosphere;
2,6-di-iso-propylaniline (Aldrich): distilled at reduced pressure and stored in an inert atmosphere;
ethyl ether (Aldrich): pure, ≥99%, distilled over sodium (Na) in an inert atmosphere;
2,4,6-tri-methylaniline (Aldrich): distilled at reduced pressure and stored in an inert atmosphere;
n-butyllithium (Aldrich): 2.5 M solution in hexane;
dichloromethane ($CH_2Cl_2$) (Acres): pure, ≥99.9%, used as it is;
Celite® 545 (Aldrich): used as it is;
hexane (Aldrich): pure, ≥99%, distilled over sodium (Na) in an inert atmosphere;
heptane (Aldrich): pure, ≥99%, distilled over sodium (Na) in an Inert atmosphere; methanol (Carlo Erba, RPE): used as it is;
toluene (Aldrich): pure, ≥99.5%, distilled over sodium (Na) in an inert atmosphere;
1,3-butadiene (Air Liquide): pure, ≥99.5%, evaporated from the container before each production, dried by passing it through a molecular sieve packed column and condensed inside the reactor that was pre-cooled to −20° C.;
isoprene (Aldrich): pure, ≥99%, refluxed over calcium hydride for 2 hours, then distilled "trap-to-trap" and stored in a nitrogen atmosphere at 4° C.;
hydrofluoric acid (HF) (40% aqueous solution) (Aldrich): used as it is;
sulfuric acid ($H_2SO_4$) (96% aqueous solution) (Aldrich): used as it is, or diluted with distilled water (1/5);
nitric add ($HNO_3$) (70% aqueous solution) (Aldrich): used as it is;
sodium carbonate ($Na_2CO_3$) (Aldrich): used as it is;
silver nitrate ($AgNO_3$) (Aldrich): used as it is;
deuterated tetrachloroethylene ($C_2D_2Cl_4$) (Acros): used as it is;
hexamethyldisiloxane (HMDS) (Acros): used as it is;
deuterated chloroform ($CDCl_3$) (Acros): used as it is;
tetramethyldisiloxane (HMDS) (Acros): used as it is;

The analysis and characterization methods reported below were used.

Elementary Analysis a) Determination of Fe

For the determination of the quantity in weight of iron (Fe) in the oxo-nitrogenated iron complexes object of the present invention, an exactly weighted aliquot, operating in dry-box under nitrogen flow, of about 30 mg-50 mg of sample, was placed in a 30 ml platinum crucible, together with a 1 ml mixture of 40% hydrofluoric add (HF), 0.25 ml of 96% sulfuric add ($H_2SO_4$) and 1 ml of 70% nitric acid ($HNO_3$). The crucible was then heated on a hot plate increasing the temperature until white sulfur fumes appeared (about 200° C.). The mixture thus obtained was cooled to ambient temperature (20° C.-25° C.) and 1 ml of 70% nitric add ($HNO_3$) was added, then it was left again until fumes appeared. After repeating the sequence another two times, a clear, almost colorless, solution was obtained. 1 ml of nitric acid ($HNO_3$) and about 15 ml of water were then added cold, then heated to 80° C. for about 30 minutes. The sample thus prepared was diluted with MilliQ pure water until it weighed about 50 g, precisely weighed, to obtain a solution on which the instrumental analytical determination was performed using a Thermo Optek IRIS Advantage Duo ICP-OES (plasma optical emission) spectrometer, for comparison with solutions of known concentration. For this purpose, for every analyte, a calibration curve was prepared in the range 0 ppm-10 ppm, measuring calibration solutions by dilution by weight of certified solutions.

The solution of sample prepared as above was then diluted again by weight in order to obtain concentrations close to the reference ones, before performing spectrophotometric measurement. All the samples were prepared in double quantities. The results was considered acceptable if the individual repeated test data did not have a relative deviation of more than 2% with respect to their mean value.

b) Determination of Chlorine

For said purpose, samples of the oxo-nitrogenated iron complexes object of the present invention, about 30 mg-50 mg, were precisely weighed in 100 ml glass beakers in dry-box under nitrogen flow. 2 g of sodium carbonate ($Na_2CO_3$) were added and, outside the dry-box, 50 ml of MilliQ water. It was brought to the boil on the hot plate, under magnetic stirring, for about 30 minutes. It was left to cool, then 1/5 diluted sulfuric acid ($H_2SO_4$) was added, until acid reaction and was then titrated with 0.1 N silver nitrate ($AgNO_3$) with a potentiometric titrator.

c) Determination of Carbon, of Hydrogen and of Nitrogen

The determination of carbon, of hydrogen and of nitrogen, in the oxo-nitrogenated iron complexes object of the present invention, like in the ligands used for the purpose of the present invention, was performed through a Carlo Erba automatic analyzer Mod. 1106.

$^{13}$C-HMR and $^1$H-HMR Spectra

The $^{13}$C-HMR and $^1$H-HMR spectra were recorded using a nuclear magnetic resonance spectrometer mod. Bruker Avance 400, using deuterated tetrachloroethylene ($C_2D_2Cl_4$) at 103° C., and hexamethyldisiloxane (HDMS) as internal standard, or using deuterated chloroform ($CDCl_3$), at 25° C., and tetramethylsilane (TMS) as internal standard. For this purpose, polymeric solutions were used with concentrations equal to 10% by weight with respect to the total weight of the polymeric solution.

The microstructure of the polymers [i.e. 1,4-cis (%) 1,4-trans (%) and 1,2(%) unit content for polybutadiene and 1,4-cis (%), 1,4-trans (%) and 3,4(%) unit content for polyisoprene] was determined through the analysis of the aforementioned spectra based on what is reported in literature by Mochel, V. D., in "*Journal of Polymer Science Part A-1: Polymer Chemistry*" (1972), Vol. 10, Issue 4, pg. 1009-1018 for polybutadiene, and by Sato H. et al. in "*Journal of Polymer Science: Polymer Chemistry Edition*" (1979), Vol. 17, Issue 11, pg. 3551-3558, for polyisoprene.

FT-IR Spectra/Solid State—UATR)

The FT-IR spectra (solid state—UATR) were recorded using a Bruker IFS 48 spectrophotometer equipped with a Thermo Spectra-Tech horizontal ATR connection.

The section wherein the samples to be analyzed are placed is a Fresnel ATR accessory (Shelton, Conn., USA) which uses crystals of zirconium selenide (ZnSe) with an angle of incidence of 45° in the horizontal direction.

The FT-IR spectra (solid state—UATR) of the oxo-nitrogenated iron complexes object of the present invention, were obtained by inserting samples of the oxo-nitrogenated iron complex to be analyzed into said section.

I.R. Spectra

The I.R. (FT-IR) spectra were recorded through Thermo Nicolet Nexus 670 and Bruker IFS 48 spectrophotometers.

The I.R. (FT-IR) spectra of the ligands used for the purpose of the present invention, were obtained by dispersing the ligand to be analyzed in anhydrous potassium bromide (KBr) (KBr disks), or in Nujol solution.

The I.R. (FT-IR) spectra of the polymers were obtained from polymeric films on potassium bromide (KBr) tablets, said films being obtained through the deposition of a solution in hot 1,2-dichlorobenzene of the polymer to be analyzed. The concentration of the polymeric solutions analyzed was equal to 10% by weight with respect to the total weight of the polymeric solution.

Determination of the Molecular Weight

The determination of the molecular weight (MW) of the polymers obtained was performed through GPC ("Gel Permeation Chromatography"), using the Waters® Alliance® GPC/V 2000 System by Waters Corporation which uses two detection lines: "Refractive Index" (RI) and "Viscometer" operating under the following conditions:

two PLgel Mixed-B columns;
solvent/eluent: o-dichlorobenzene (Aldrich);
flow rate: 0.8 ml/min;
temperature: 145° C.;
molecular mass calculation: Universal Calibration method.

The weight-average molecular weight ($M_w$) and the Polydispersion Index (PDI) are reported, corresponding to the ratio $M_w/M_n$ ($M_n$=number-average molecular weight).

Mass Spectra

The mass spectra of the ligands used for the purpose of the present invention were performed with a Trace DSQ single quadrupole mass spectrometer (Thermo ISQ) in Electronic Ionization (EI mode), operating under the following conditions:

scanning: from 35 amu to 600 amu (amu=atomic mass unit);
temperature of the source: 250° C.;
transfer line temperature: 300° C.;

capillary column: MDN-5S (Supelco) (length=30 m; diameter=0.25 mm; stationary phase thickness=0.25 μm);
carrier gas: helium (He) with constant flow equal to 1 ml/min.

Example 1

Synthesis of Ligand Having Formula (L1)

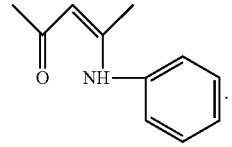

(L1)

5 g (50 mmoles) of 2,4-pentandione were placed in a 500 ml flask equipped with a Dean-Stark trap for the azeotropic removal of water, together with 100 ml of benzene, some drops of hydrochloric acid and 4.66 g (50 mmoles) of aniline: the mixture obtained was heated under reflux, for 24 hours. Subsequently, the mixture was cooled to ambient temperature, filtered on a porous septum obtaining a filtrate which was evaporated under vacuum obtaining a solid product. The solid product thus obtained was dissolved in ethyl ether (40 ml) and placed in the freezer for 24 hours, obtaining a precipitate that was filtered and dried, under vacuum, at ambient temperature, obtaining 7 g of a white crystalline product (yield=80%) having formula (L1).

Elementary analysis [found (calculated for $C_{11}H_{13}NO$)]: C: 75.20% (75.40%); H: 7.50% (7.48%); N: 8.00% (7.99%).

Molecular weight (MW): 175.23.

FT-IR (solid state—UATR) 1590 cm$^{-1}$; 1571 cm$^{-1}$.

$^1$H-NMR (CD$_2$Cl$_2$, δ ppm): 12.49 (s, 1H NH), 8.27 (d, 1H PyH), 7.34-7.28 (m, 2H ArH), 7.19-7.15 (m, 1H ArH), 7.10-7.08 (m, 2H ArH), 5.18 (s, 1H CH), 2.09 (s, 3H CH$_3$), 1.97 (s, 3H CH$_3$).

GC-MS: M$^+$=m/z 175.

Example 2

Synthesis of Ligand Having Formula (L2)

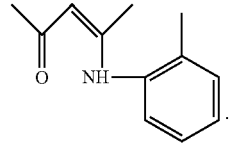

(L2)

30 g (300 mmoles) of 2,4-pentandione were placed in a 500 ml flask equipped with a Dean-Stark trap for the azeotropic removal of water, together with 300 ml of benzene, some drops of hydrochloric acid and 32.1 g (300 mmoles) of o-toluidine: the mixture obtained was heated under reflux, for 24 hours. Subsequently, the mixture was cooled to ambient temperature, filtered on a porous septum obtaining a filtrate which was evaporated under vacuum obtaining a solid product. The solid product thus obtained was dissolved in ethyl ether (100 ml) and placed in the freezer for 24 hours, obtaining a precipitate that was filtered and dried, under vacuum, at ambient temperature, obtaining 35 g of a white crystalline product (yield=61%) having formula (L2).

Elementary analysis [found (calculated for $C_{12}H_{15}NO$)]: C: 76.18% (76.16%); H: 7.97% (7.99%); N: 7.37% (7.40%).

Molecular weight (MW): 189.26.

FT-IR (solid state—UATR) 1595 cm$^{-1}$; 1560 cm$^{-1}$.

$^1$H-NMR (CD$_2$Cl$_2$, δ ppm): 1.87 (s, 3H CH$_3$CN), 2.11 (s, 3H CH$_3$CO), 2.28 (s, 3H C$_6$H$_2$CH$_3$), 5.20 (s, 1H CH), 7.06-7.23 (s, 4H C$_6$H$_4$), 12.35 (s, 1H NH).

GC-MS: M$^+$=m/z 189.

Example 3

Synthesis of Ligand Having Formula (L3)

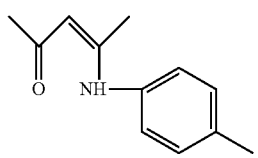

(L3)

5 g (50 mmoles) of 2,4-pentandione were placed in a 500 ml flask equipped with a Dean-Stark trap for the azeotropic removal of water, together with 75 ml of benzene, some drops of hydrochloric add and 5.35 g (50 mmoles) of p-toluidine: the mixture obtained was heated under reflux, for 24 hours. Subsequently, the mixture was cooled to ambient temperature, filtered on a porous septum obtaining a filtrate which was evaporated under vacuum obtaining a solid product. The solid product thus obtained was dissolved in ethyl ether (10 ml) and placed in the freezer for 24 hours, obtaining a precipitate that was filtered and dried, under vacuum, at ambient temperature, obtaining 5.7 g of a white crystalline product (yield=60%) having formula (L3).

Elementary analysis [found (calculated for $C_{12}H_{15}NO$)]: C: 76.13% (76.16%); H: 7.87% (7.99%); N: 7.36% (7.40%).

Molecular weight (MW): 189.26.

FT-IR (KBr): 1609 cm$^{-1}$; 1565 cm$^{-1}$.

$^1$H-NMR (CD$_2$Cl$_2$, δ ppm): 1.93 (s, 3H CH$_3$), 2.05 (s, 3H CH$_3$), 2.31 (s, 3H CH$_3$), 5.15 (s, 1H CH), 6.98 (d, 2H Ph), 7.13 (d, 2H Ph), 12.38 (s, 1H, NH).

GC-MS: M$^+$=m/z 189.

Example 4

Synthesis of Ligand Having Formula (L4)

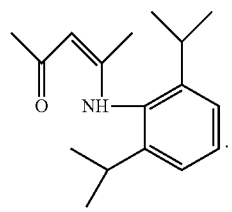

(L4)

5 g (50 mmoles) of 2,4-pentandione were placed in a 500 ml flask equipped with a Dean-Stark trap for the azeotropic removal of water, together with 75 ml of benzene, some drops of hydrochloric acid and 8.9 g (50 mmoles) of 2,6-di iso-propylaniline: the mixture obtained was heated under reflux, for 24 hours. Subsequently, the mixture was cooled to ambient temperature, filtered on a porous septum obtaining a filtrate which was evaporated under vacuum obtaining a solid product. The solid product thus obtained was dissolved in ethyl ether (10 ml) and placed in the freezer for 24 hours, obtaining a precipitate that was filtered and dried, under vacuum, at ambient temperature, obtaining 6.5 g of a white crystalline product (yield=50%) having formula (L4).

Elementary analysis [found (calculated for $C_{17}H_{23}NO$)]: C: 78.60% (78.72%); H: 9.60% (9.71%); N: 5.32% (5.40%).

Molecular weight (MW): 259.39.

FT-IR (KBr): 1606 cm$^{-1}$; 1567 cm$^{-1}$.

$^1$H NMR (CDCl$_3$, δ ppm): 1.11 (d, 6H, CH(CH$_3$)$_2$), 1.18 (d, 6H, CH(CH$_3$)$_2$), 1.60 (s, 3H CH$_3$CN), 2.10 (s, 3H CH$_3$CO), 3.00 (sept 2H, CHMe$_2$), 5.19 (s, 1H CHCO), 7.12-7.28 (m, 3H, Ar), 12.05 (s, 1H NH).

GC-MS: M$^+$=m/z 259.

Example 5

Synthesis of Ligand Having Formula (L5)

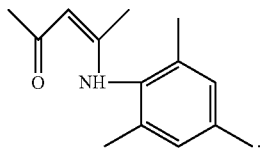

(L5)

5 g (50 mmoles) of 2,4-pentandione were placed in a 500 ml flask equipped with a Dean-Stark trap for the azeotropic removal of water, together with 75 ml of benzene, some drops of hydrochloric acid and 6.76 g (50 mmoles) of 2,4,6-tri-methylaniline: the mixture obtained was heated under reflux, for 24 hours. Subsequently, the mixture was cooled to ambient temperature, filtered on a porous septum obtaining a filtrate which was evaporated under vacuum obtaining a solid product. The solid product thus obtained was dissolved in ethyl ether (10 ml) and placed in the freezer for 24 hours, obtaining a precipitate that was filtered and dried, under vacuum, at ambient temperature, obtaining 4.8 g of a light yellow product (yield=44%) having formula (L5).

Elementary analysis [found (calculated for $C_{14}H_{19}NO$)]: C: 77.40% (77.38%); H: 9.00% (8.81%); N: 6.32% (6.45%).

Molecular weight (MW): 217.31.

FT-IR (solid state, ATR): 1606 cm$^{-1}$; 1567 cm$^{-1}$.

$^1$H-NMR (CD$_2$Cl$_2$, δ ppm): 1.6 (s, 3H CH$_3$CN), 2.05 (s, 3H CH$_3$CO), 2.18 (s, 6H 2-C$_6$H$_2$CH$_3$), 2.28 (s, 3H 4-C$_6$H$_2$CH$_3$), 5.21 (s, 1H CH), 6.92 (s, 2H CM), 11.82 (s, 1H NH).

GC-MS: M$^+$=m/z 217.

Example 6

Synthesis of FeCl$_2$(L1) [Sample MG101]

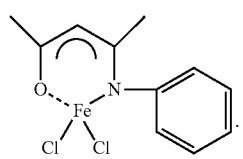

(MG101)

In a 100 ml flask, a solution of n-butyllithium (2.5 M in hexane; 0.6 ml; 1.43 mmoles) was added to a solution of the ligand having formula (L1) (250 mg; 1.43 mmoles), obtained as described in Example 1, in hexane (40 ml), maintained at −40° C.: the solution obtained was left to return to ambient temperature slowly and maintained at said temperature, under stirring, for about 4 hours. Subsequently, iron trichloride ($FeCl_3$) (232 mg; 1.43 mmoles; molar ratio L1/Fe=1) was added: the brown suspension obtained was left, under stirring, at ambient temperature, for about 5 hours. The solvent was then removed under vacuum, at ambient temperature, and the residue obtained was suspended in dichloromethane ($CH_2Cl_2$) (20 ml). The suspension obtained was filtered on Celite® 545 and the solution obtained was dried, under vacuum, at ambient temperature, obtaining 275 mg of a dark brown solid product corresponding to the complex $FeCl_2(L1)$, equal to a 64% conversion with respect to the iron trichloride ($FeCl_3$) loaded.

Elementary analysis [found (calculated for $C_{11}H_{12}Cl_2FeNO$)]: C: 43.45% (43.89%); H: 4.31% (4.02%); N: 4.48% (4.65%); Cl: 22.99% (23.56%); Fe: 17.95% (18.55%).

FIG. 1 shows the FT-IR spectrum (solid state—UATR) of the complex $FeCl_2(L1)$ obtained.

Example 7

Synthesis of $FeCl_2(L1)_2$ [Sample MG110]

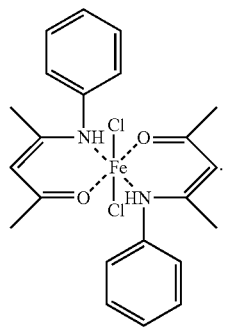

(MG110)

In a 100 ml flask, the iron dichloride:tetrahydrofuran complex (1:1.5) [$FeCl_2(THF)_{1.5}$] (237 mg; 1.01 mmoles; molar ratio L1/Fe=2) was added to a solution of the ligand having formula (L1) (353 mg; 2.02 mmoles), obtained as described in Example 1, in tetrahydrofuran (THF) (40 ml): the intense orange mixture obtained was maintained, under stirring, at ambient temperature, for 3 hours. The solvent was then removed under vacuum and the residue obtained was dried under vacuum, at ambient temperature, obtaining 450 mg of an orange solid product corresponding to the complex $FeCl_2(L1)_2$, equal to a 93% conversion with respect to the iron dichloride:tetrahydrofuran complex (1:1.5) [$FeCl_2(THF)_{1.5}$] loaded.

Elementary analysis [found (calculated for $C_{22}H_{26}Cl_2FeN_2O_2$)]: C: 55.95% (55.37%); H: 5.01% (5.49%); N: 5.48% (5.87%); Cl: 15.01% (14.85%); Fe: 11.25% (11.70%).

FIG. 2 shows the FT-IR spectrum (solid state—UATR) of the complex $FeCl_2(L1)_2$ obtained.

Example 8

Synthesis of $FeCl_2(L2)$ [Sample MG199]

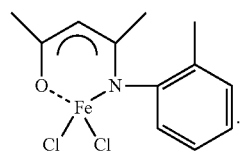

(MG199)

In a 100 ml flask, a solution of n-butyllithium (2.5 M in hexane; 0.46 ml; 1.14 mmoles) was added to a solution of the ligand having formula (L2) (215 mg; 1.14 mmoles), obtained as described in Example 2, in hexane (30 ml), maintained at −40° C.: the solution obtained was left to return to ambient temperature slowly and maintained at said temperature, under stirring, for about 4 hours. Subsequently, iron trichloride ($FeCl_2$) (185 mg; 1.14 mmoles; molar ratio L2/Fe=1) was added: the brown suspension obtained was left, under stirring, at ambient temperature, for about 5 hours. The solvent was then removed under vacuum, at ambient temperature, and the residue obtained was suspended in dichloromethane ($CH_2Cl_2$) (20 ml). The suspension obtained was filtered on Celite® 545 and the solution obtained was dried, under vacuum, at ambient temperature, obtaining 224 mg of a purple solid product corresponding to the complex $FeCl_2(L2)$, equal to a 62% conversion with respect to the iron trichloride ($FeCl_3$) loaded.

Elementary analysis [found (calculated for $C_{12}H_{14}Cl_2FeNO$)]: C: 45.05% (45.75%); H: 4.03% (4.46%); N: 4.12% (4.45%); Cl: 22.00% (22.51%); Fe: 17.54% (17.73%).

FIG. 3 shows the FT-IR spectrum (solid state—UATR) of the complex $FeCl_2(L2)$ obtained.

Example 9

Synthesis of $FeCl_2(L2)_2$ [Sample MG114]

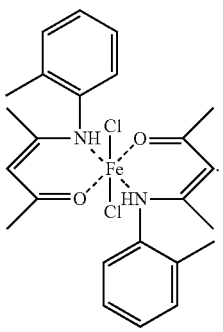

(MG114)

In a 100 ml flask, iron dichloride tetrahydrate ($FeCl_2 \cdot 4H_2O$) (638 mg; 3.38 mmoles; molar ratio L2/Fe=2) was added to a solution of the ligand having formula (L2) (353 mg; 2.02 mmoles), obtained as described in Example 2, in tetrahydrofuran (THF) (40 ml): the intense orange mixture obtained was maintained, under stirring, at ambient temperature, for 3 hours. The solvent was then removed under vacuum and the residue obtained was dried under vacuum, at ambient temperature, obtaining 700 mg of an orange solid product corresponding to the complex $FeCl_2(L2)_2$, equal to a 93% conversion with respect to the iron dichloride tetrahydrate ($FeCl_2 \cdot 4H_2O$) loaded.

Elementary analysis [found (calculated for $C_{24}H_{30}Cl_2FeN_2O_2$)]: C: 56.95% (57.05%); H: 5.51% (5.98%); N: 5.48% (5.54%); Cl: 14.51% (14.03%); Fe: 11.95% (11.05%).

FIG. 4 shows the FT-IR spectrum (solid state—UATR) of the complex $FeCl_2(L2)_2$ obtained.

Example 10

Synthesis of $FeCl_2(L3)$ [Sample MG200]

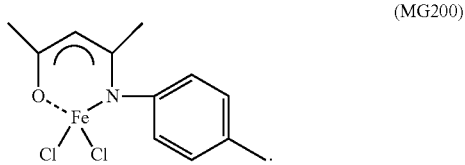
(MG200)

In a 100 ml flask, a solution of n-butyllithium (2.5 M In hexane; 0.44 ml; 1.10 mmoles) was added to a solution of the ligand having formula (L3) (208 mg; 1.10 mmoles), obtained as described in Example 3, in hexane (30 ml), maintained at 40° C.: the solution obtained was left to return to ambient temperature slowly and maintained at said temperature, under stirring, for about 4 hours. Subsequently, iron trichloride ($FeCl_3$) (179 mg; 1.10 mmoles; molar ratio L3/Fe=1) was added: the brown suspension obtained was left, under stirring, at ambient temperature, for about 5 hours. The solvent was then removed under vacuum, at ambient temperature, and the residue obtained was suspended in dichloromethane ($CH_2Cl_2$) (20 ml). The suspension obtained was filtered on Celite® 545 and the solution obtained was dried, under vacuum, at ambient temperature, obtaining 184 mg of a purple solid product corresponding to the complex $FeCl_2(L3)$, equal to a 53% conversion with respect to the iron trichloride ($FeCl_3$) loaded.

Elementary analysis [found (calculated for $C_{12}H_{14}Cl_2FeNO$)]: C: 44.99% (45.75%); H: 4.31% (4.48%); N: 4.56% (4.45%); Cl: 22.20% (22.51%); Fe: 18.05% (17.73%).

FIG. 5 shows the FT-IR spectrum (solid state—UATR) of the complex $FeCl_2(L3)$ obtained.

Example 11

Synthesis of $FeCl_2(L3)_2$ [Sample MG137]

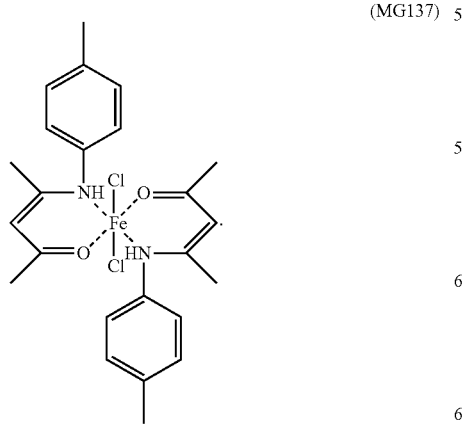
(MG137)

In a 100 ml flask, the iron dichloride:tetrahydrofuran complex (1:1.5) $[FeCl_2(THF)_{1.5}]$ (94 mg; 0.36 mmoles; molar ratio L3/Fe=2) was added to a solution of the ligand having formula (L3) (135 mg; 0.71 mmoles), obtained as described in Example 3, in tetrahydrofuran (THF) (20 ml): the intense orange mixture obtained was maintained, under stirring, at ambient temperature, for 3 hours. The solvent was then removed under vacuum and the residue obtained was washed with heptane (2×10 ml) and dried under vacuum, at ambient temperature, obtaining 161 mg of an orange solid product corresponding to the complex $FeCl_2(L3)_2$, equal to an 89% conversion with respect to the iron dichloride:tetrahydrofuran complex (1:1.5) $[FeCl_2(THF)_{1.5}]$ loaded.

Elementary analysis [found (calculated for $C_{24}H_{30}Cl_2FeN_2O_2$)]: C: 56.75% (57.05%); H: 5.61% (5.98%); N: 5.75% (5.54%); Cl: 14.81% (14.03%); Fe: 11.55% (11.05%).

FIG. 6 shows the FT-IR spectrum (solid state—UATR) of the complex $FeCl_2(L3)_2$ obtained.

Example 12

Synthesis of $FeCl_2(L4)$ [Sample MG201]

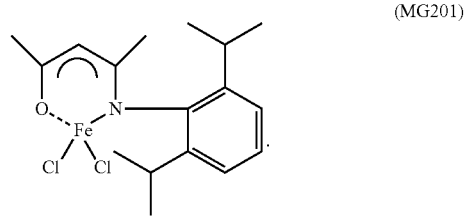
(MG201)

In a 100 ml flask, a solution of n-butyllithium (2.5 M In hexane; 0.28 ml; 0.69 mmoles) was added to a solution of the ligand having formula (L4) (180 mg; 0.69 mmoles), obtained as described in Example 4, in hexane (15 ml), maintained at −40° C.: the solution obtained was left to return to ambient temperature slowly and maintained at said temperature, under stirring, for about 4 hours. Subsequently, iron trichloride ($FeCl_2$) (113 mg; 0.69 mmoles; molar ratio L4/Fe=1) was added: the brown suspension obtained was left, under stirring, at ambient temperature, for about 5 hours. The solvent was then removed under vacuum, at ambient temperature, and the residue obtained was suspended in dichloromethane ($CH_2Cl_2$) (20 ml). The suspension obtained was filtered on Celite® 545 and the solution obtained was dried, under vacuum, at ambient temperature, obtaining 205 mg of a purple solid product corresponding to the complex $FeCl_2(L4)$, equal to a 77% conversion with respect to the iron trichloride ($FeCl_2$) loaded.

Elementary analysis [found (calculated for $C_{17}H_{24}Cl_2FeNO$)]: C: 52.56% (53.02%); H: 6.00% (6.28%); N: 3.01% (3.64%); Cl: 17.99% (18.41%); Fe: 15.01% (14.50%).

FIG. 7 shows the FT-IR spectrum (sold state—UATR) of the complex $FeCl_2(L4)$ obtained.

Example 13

Synthesis of $FeCl_2(L4)_2$ [Sample MG145]

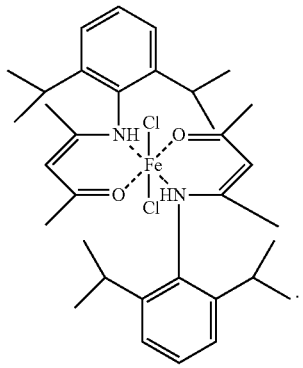

(MG145)

In a 100 ml flask, the iron dichloride:tetrahydrofuran complex (1:1.5) $[FeCl_2(THF)_{1.5}]$ (134 mg; 0.57 mmoles; molar ratio L4/Fe=2) was added to a solution of the ligand having formula (L4) (296 mg; 1.14 mmoles), obtained as described in Example 4, in tetrahydrofuran (THF) (20 ml): the intense orange mixture obtained was maintained, under stirring, at ambient temperature, for 3 hours. The solvent was then removed under vacuum and the residue obtained was washed with heptane (2×10 ml) and dried under vacuum, at ambient temperature, obtaining 292 mg of an orange solid product corresponding to the complex $FeCl_2(L4)_2$, equal to a 79% conversion with respect to the iron dichloride:tetrahydrofuran complex (1:1.5) $[FeCl_2(THF)_{1.5}]$ loaded.

Elementary analysis [found (calculated for $C_{34}H_{50}Cl_2FeN_2O_2$)]: C: 63.75% (63.26%); H: 7.61% (7.81%); N: 4.75% (4.34%); Cl: 10.21% (10.98%); Fe: 8.15% (8.65%).

FIG. 8 shows the FT-IR spectrum (solid state—UATR) of the complex $FeCl_2(L4)_2$ obtained.

Example 14

Synthesis of $FeCl_2(L5)$ [Sample MG102]

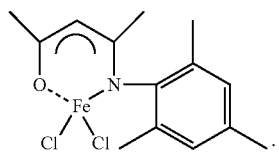

(MG102)

In a 100 ml flask, a solution of n-butyllithium (2.5 M In hexane; 0.55 ml; 1.37 mmoles) was added to a solution of the ligand having formula (L5) (298 mg; 1.37 mmoles), obtained as described in Example 5, in hexane (40 ml), maintained at −40° C.: the solution obtained was left to return to ambient temperature slowly and maintained at said temperature, under stirring, for about 4 hours. Subsequently, iron trichloride ($FeCl_3$) (223 mg; 1.37 mmoles; molar ratio L5/Fe=1) was added: the brown suspension obtained was left, under stirring, at ambient temperature, for about 5 hours. The solvent was then removed under vacuum, at ambient temperature, and the residue obtained was suspended in dichloromethane ($CH_2Cl_2$) (20 ml). The suspension obtained was filtered on Celite® 545 and the solution obtained was dried, under vacuum, at ambient temperature, obtaining 383 mg of a purple solid product corresponding to the complex $FeCl_2(L5)$, equal to a 74% conversion with respect to the iron trichloride ($FeCl_3$) loaded.

Elementary analysis [found (calculated for $C_{14}H_{18}Cl_2FeNO$)]: C: 49.75% (49.02%); H: 5.61% (5.29%); N: 4.43% (4.08%); Cl: 20.21% (20.67%); Fe: 15.85% (16.28%).

FIG. 9 shows the FT-IR spectrum (solid state—UATR) of the complex $FeCl_2(L5)$ obtained.

Example 15

Synthesis of $FeCl_2(L5)_2$ [Sample MG112]

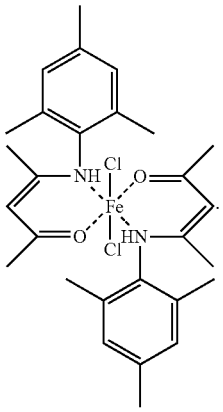

(MG112)

In a 100 ml flask, the iron dichloride:tetrahydrofuran complex (1:1.5) $[FeCl_2(THF)_{1.5}]$ (309 mg; 1.32 mmoles; molar ratio L5/Fe=2) was added to a solution of the ligand having formula (L5) (571 mg; 2.64 mmoles), obtained as described in Example 5, in tetrahydrofuran (THF) (40 ml): the intense orange mixture obtained was maintained, under stirring, at ambient temperature, for 3 hours. The solvent was then removed under vacuum and the residue obtained was washed with heptane (2×10 ml) and dried under vacuum, at ambient temperature, obtaining 651 mg of an orange solid product corresponding to the complex $FeCl_2(L5)_2$, equal to an 88% conversion with respect to the iron dichloride:tetrahydrofuran complex (1:1.5) $[FeCl_2(THF)_{1.5}]$ loaded.

Elementary analysis [found (calculated for $C_{28}H_{38}Cl_2FeN_2O_2$)]: C: 59.25% (59.91%); H: 6.61% (6.82%); N: 4.78% (4.99%); Cl: 12.21% (12.63%); Fe: 9.25% (9.95%).

FIG. 10 shows the FT-IR spectrum (solid state—UATR) of the complex $FeCl_2(L5)_2$ obtained.

Example 16 (G1470)

2 ml of 1,3-butadiene equal to about 1.4 g were condensed, cold (−20° C.) in a 25 ml test tube. Subsequently, 8.2 ml of toluene were added and the temperature of the solution thus obtained was brought to 20° C. Then, methylaluminoxane (MAO) in toluene solution (6.3 ml; $1\times10^{-2}$ motes, equal to about 0.58 g) was added and, subsequently, the $FeCl_2(L1)$ complex [sample MG101] (1.5 ml of toluene solution at a concentration equal to 2 mg/ml; $1\times10^{-5}$ moles, equal to about 3.01 mg) obtained as described in Example 6. The whole was kept under magnetic stirring, at ambient temperature, for 3 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.754 g of polybutadiene having a mixed 1,4-cis/1,2 structure: further characteristics of the process and of the polybutadiene obtained are reported in Table 1.

Example 17 (G1471)

Figure 1:
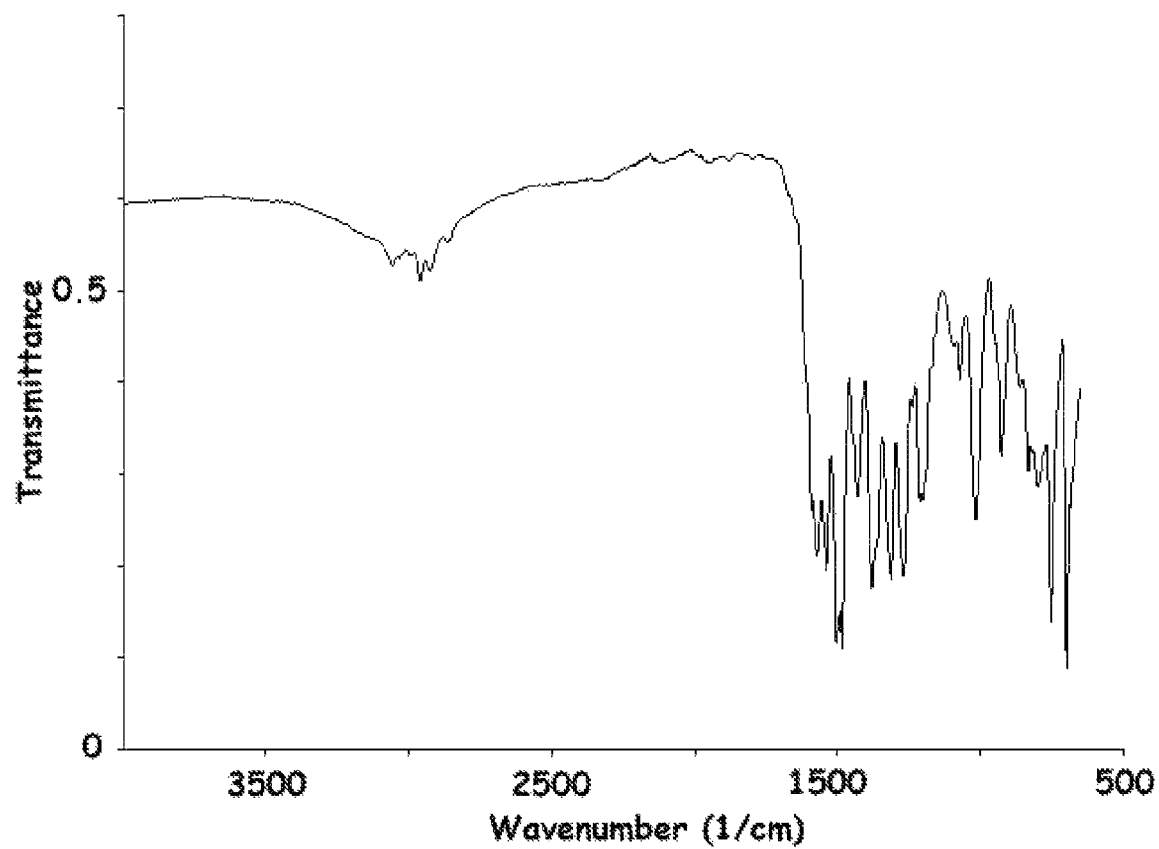
Figure 2:
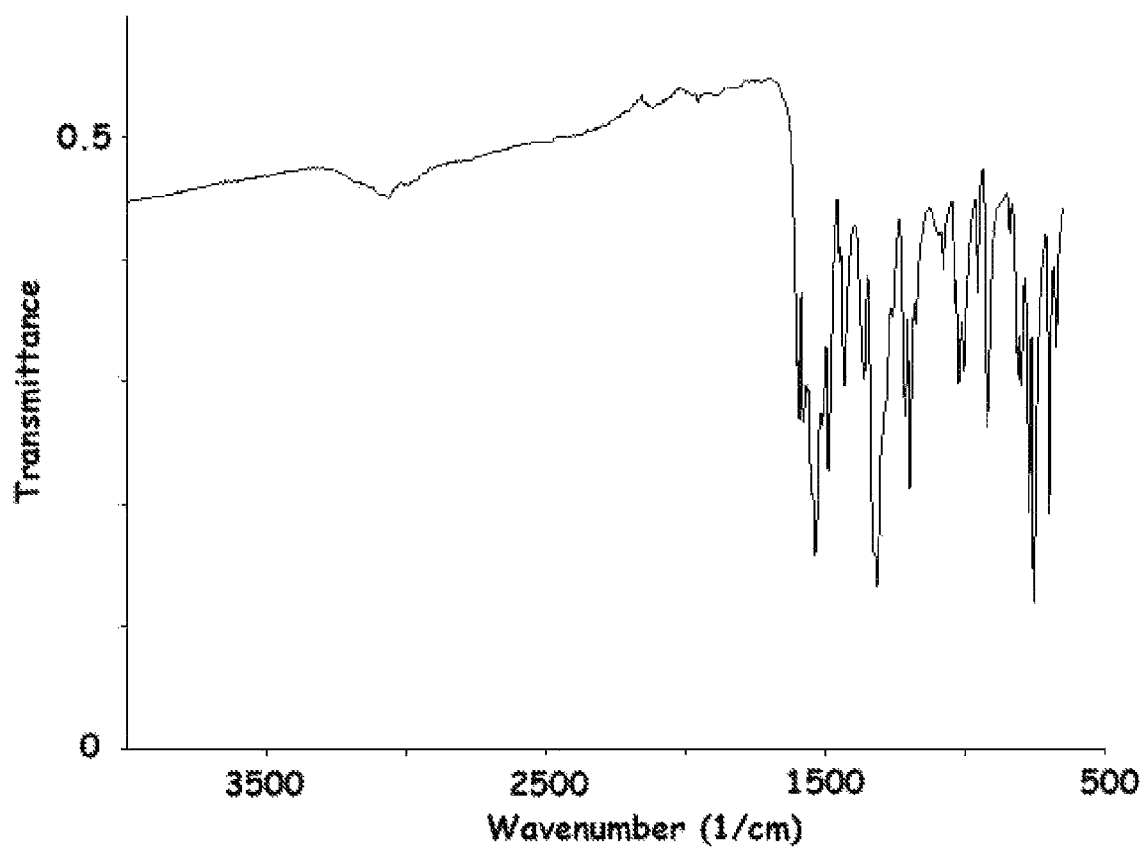
Figure 3:
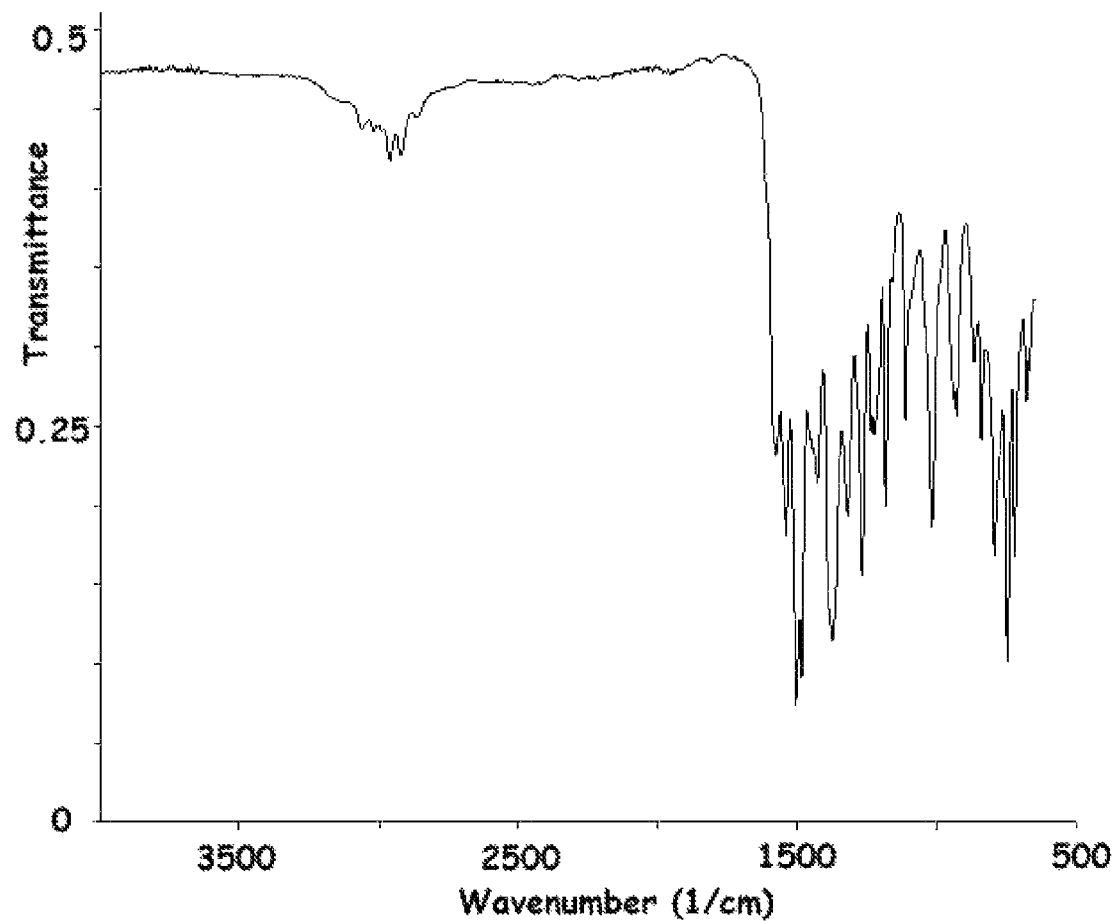
Figure 4:
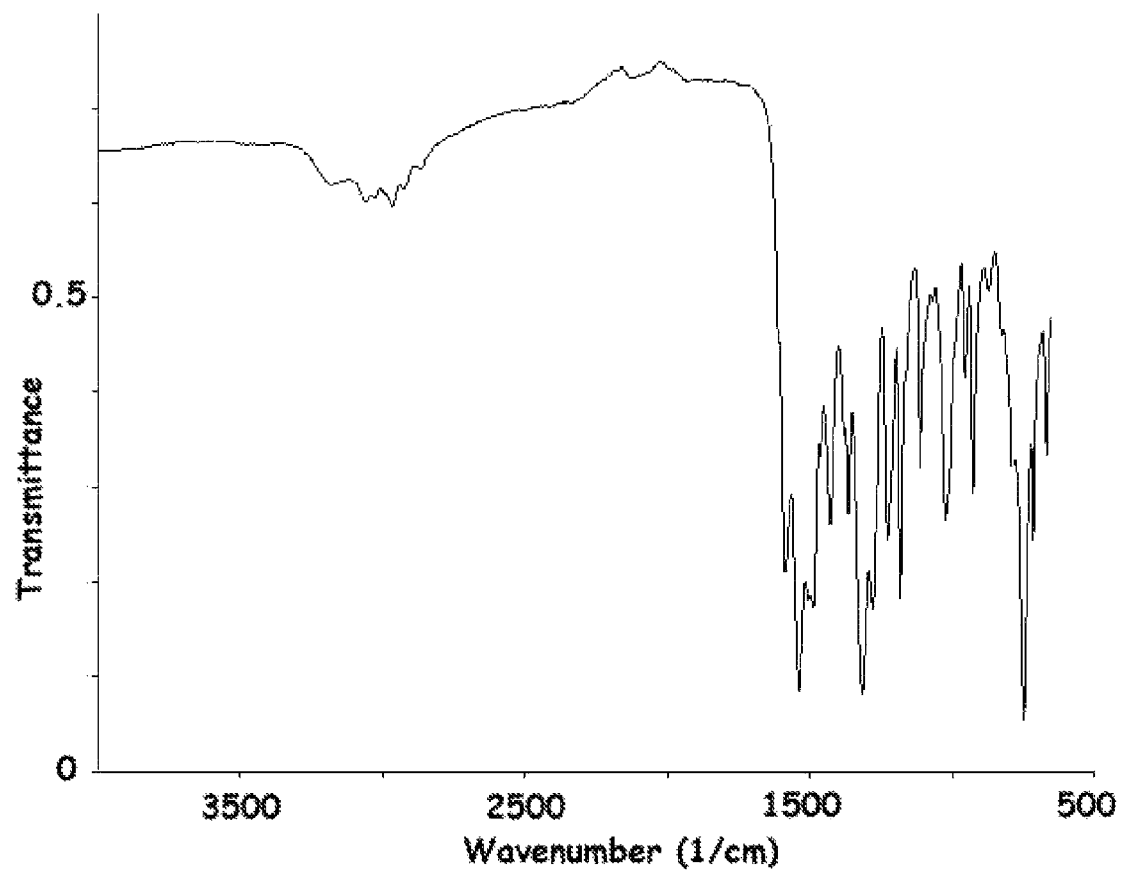
Figure 5:
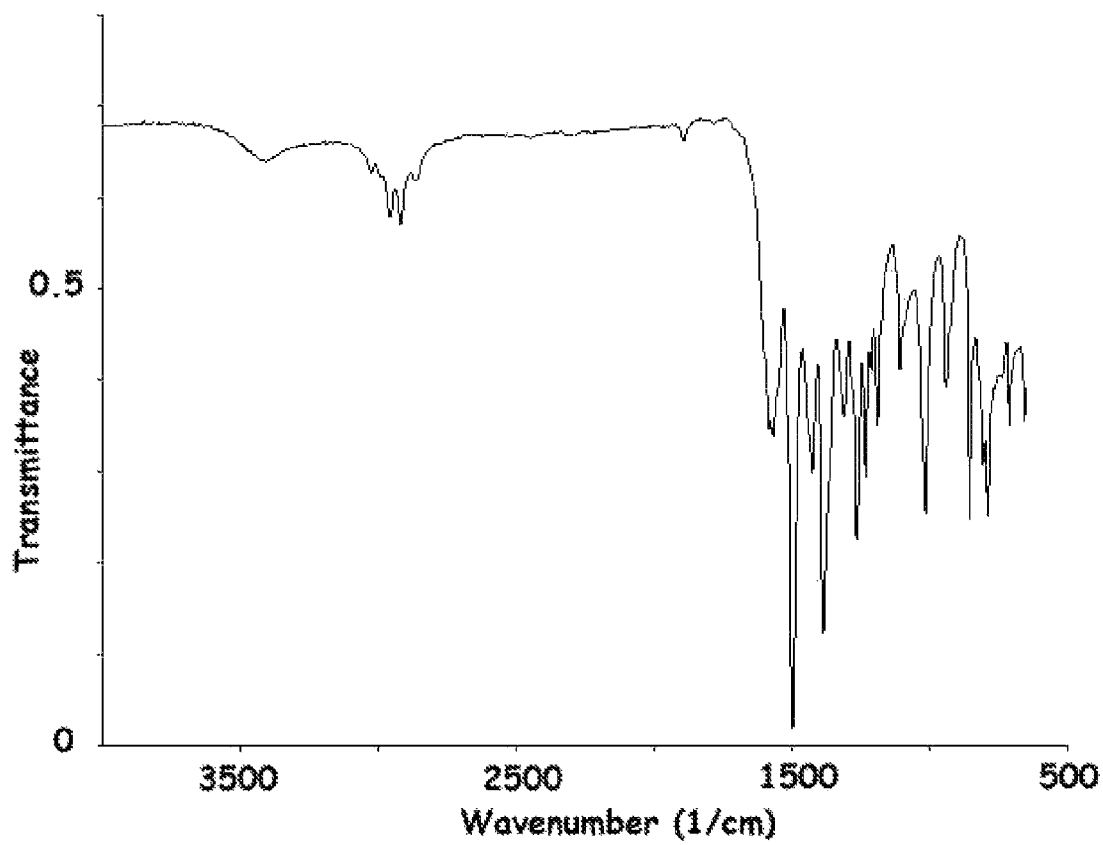
Figure 6:
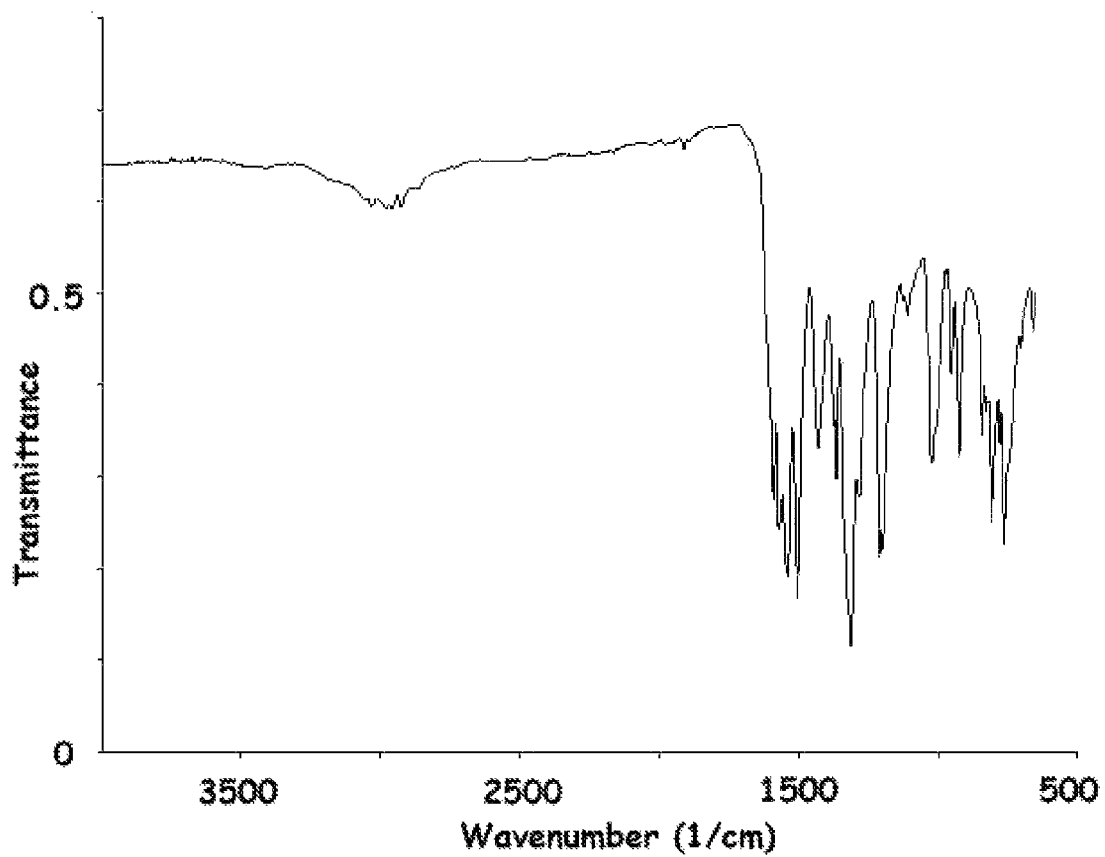
Figure 7:
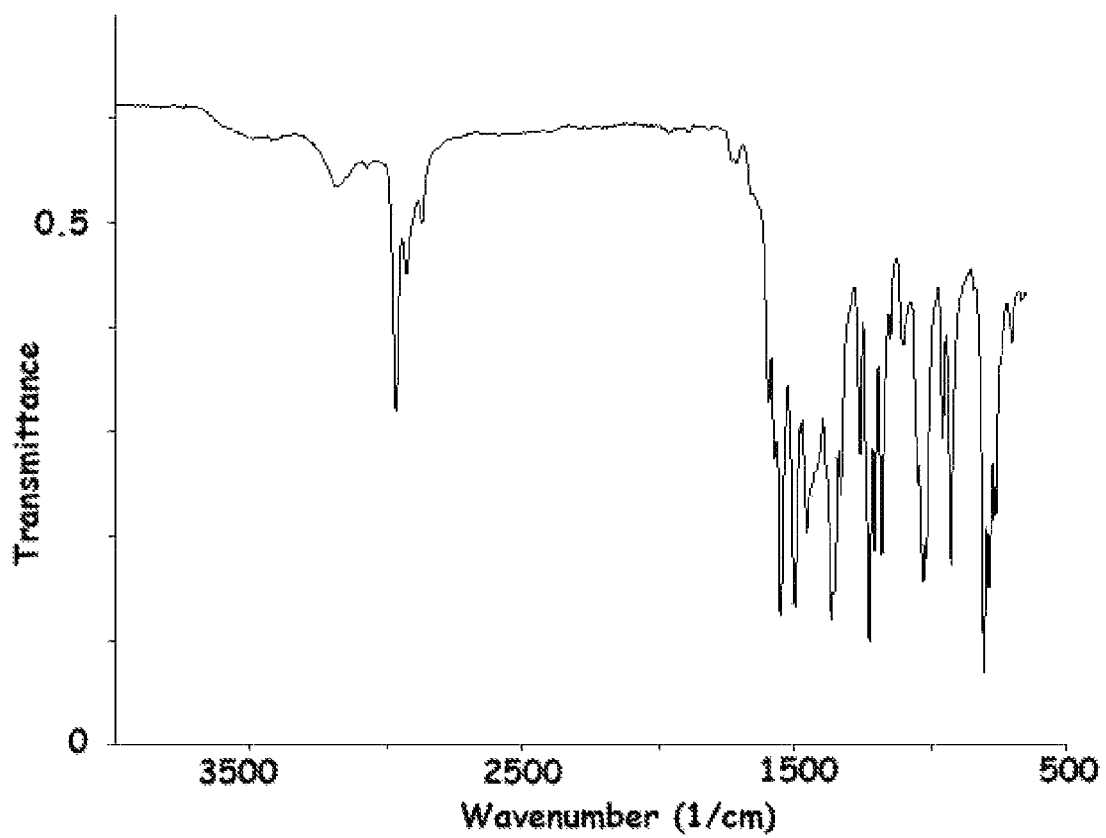
Figure 8:
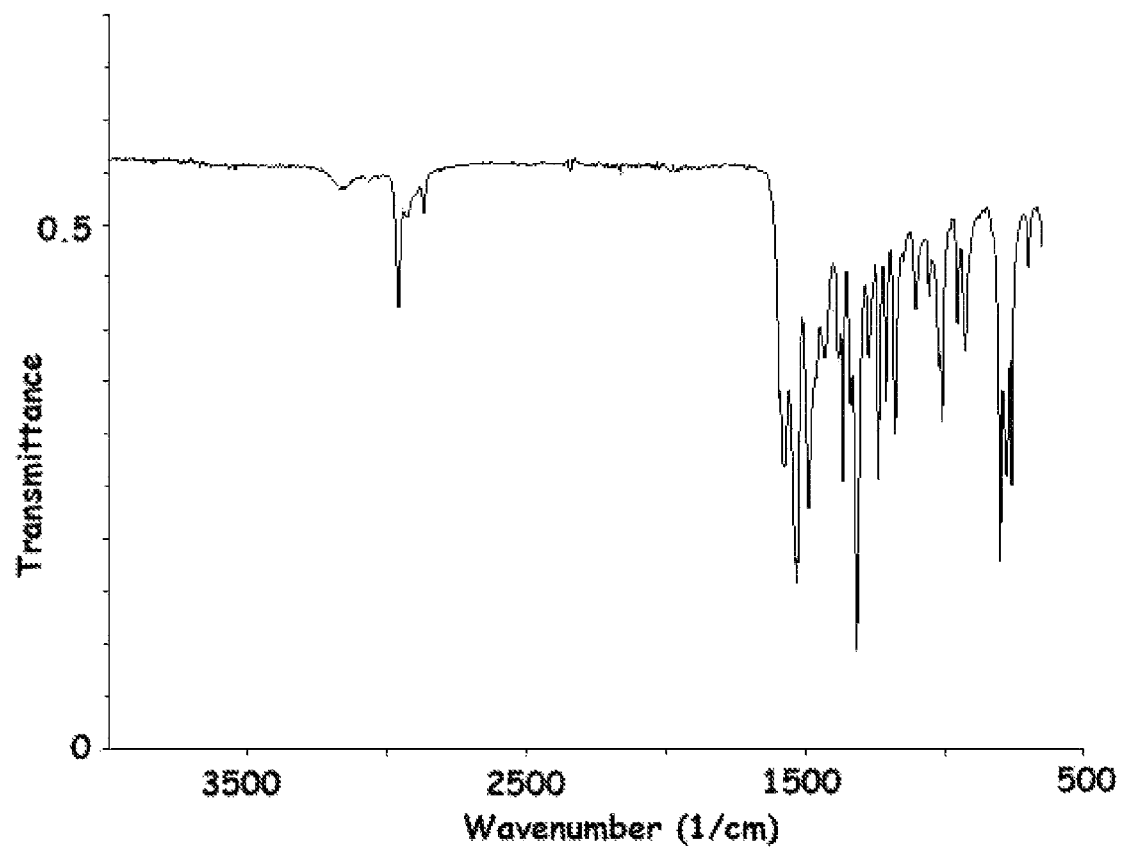
Figure 9:
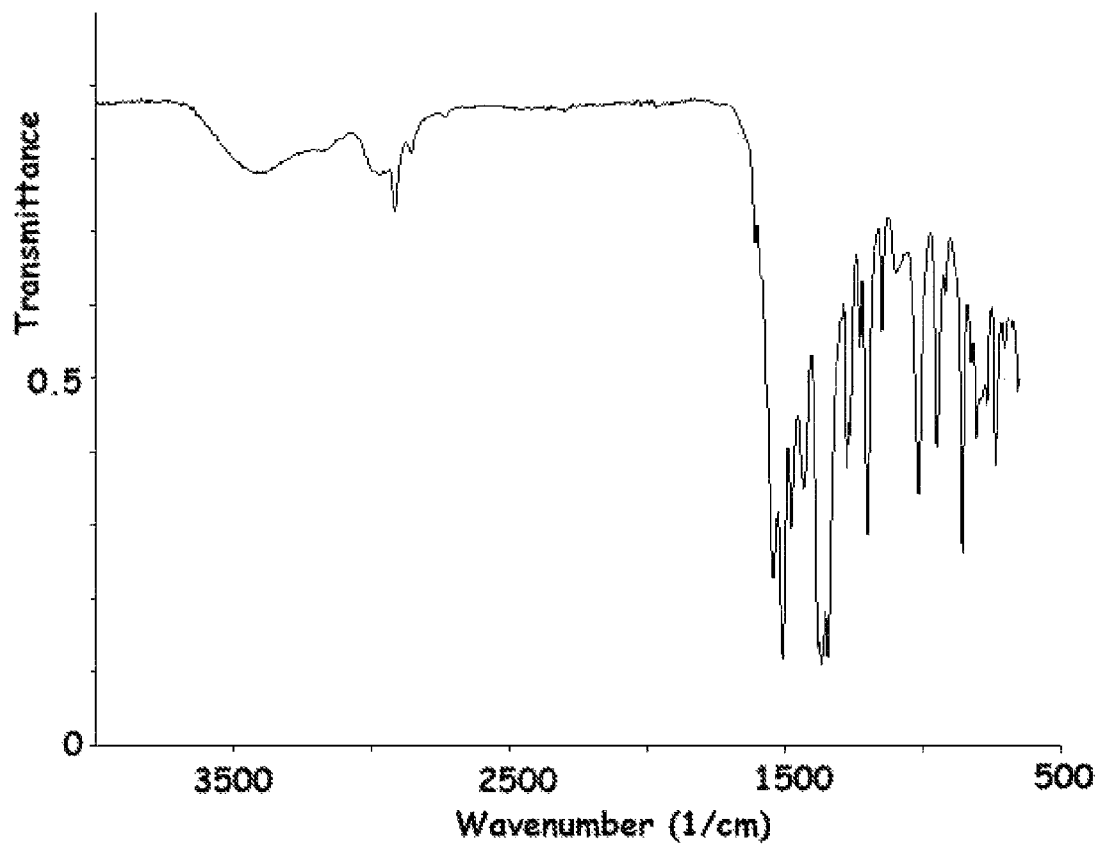
Figure 10:
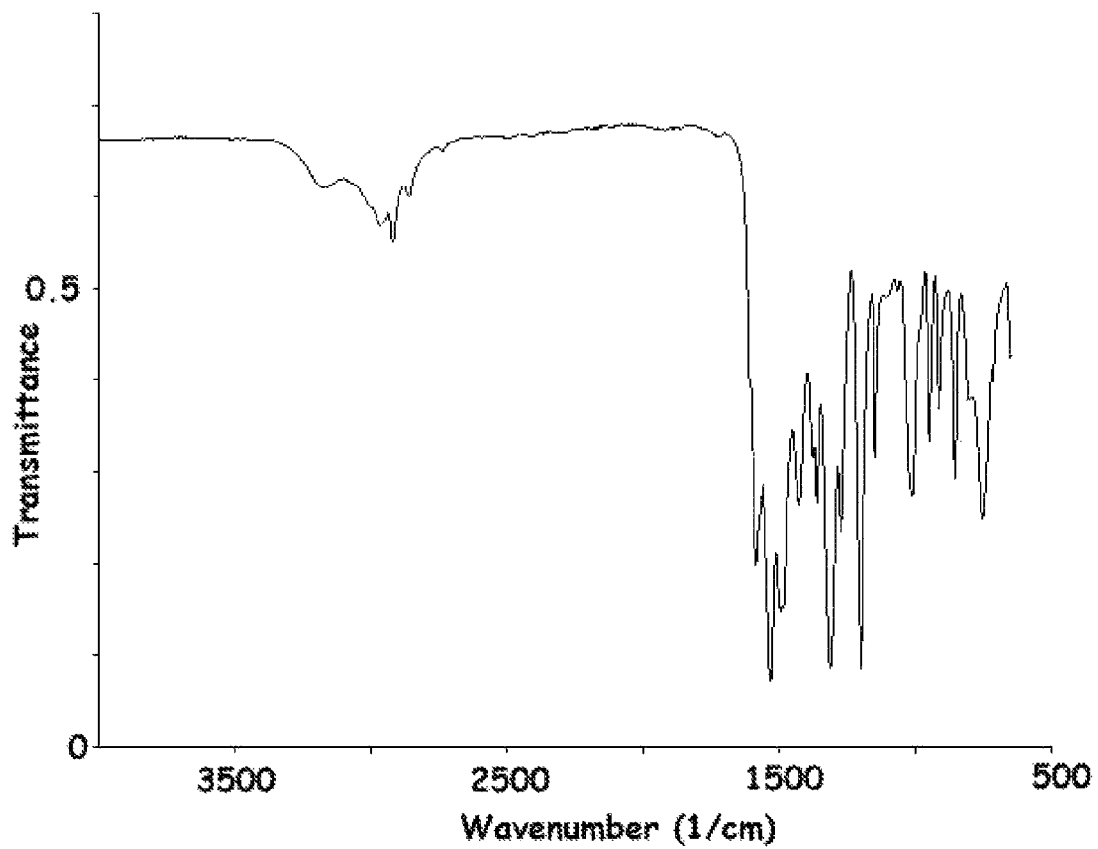
Figure 11:
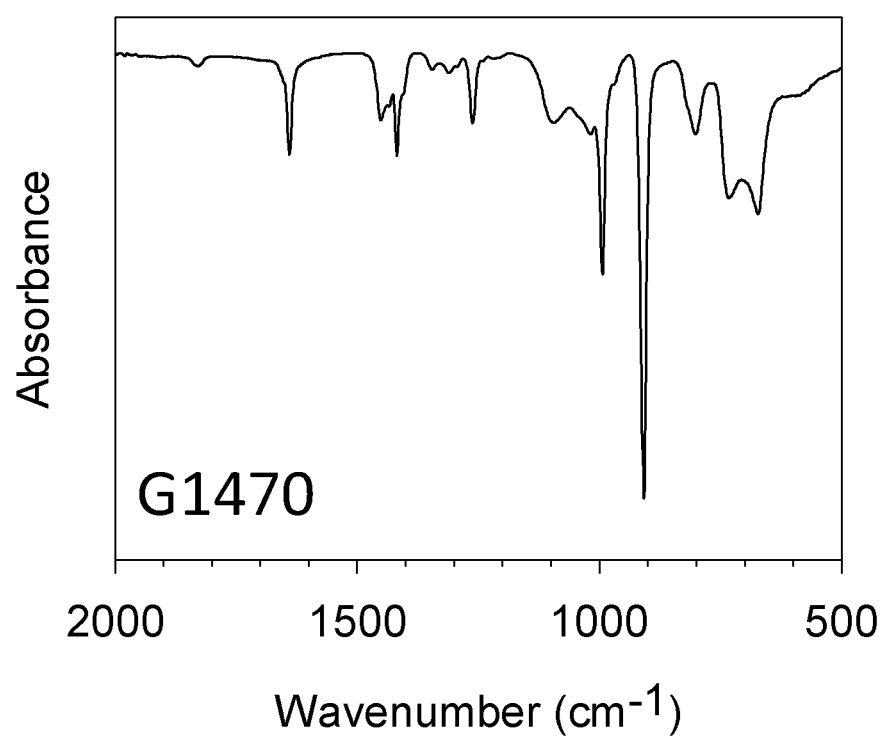
FIG. 11 shows the FT-IR spectrum of the polybutadiene obtained.
Figure 12:
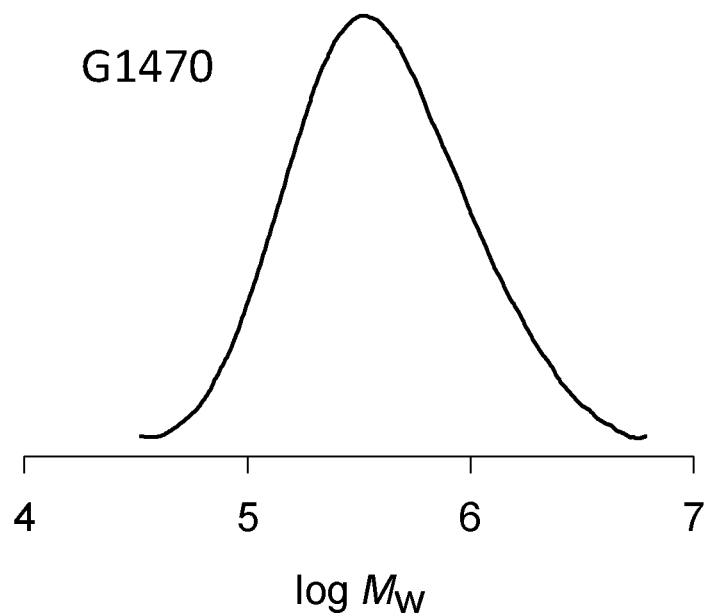
FIG. 12 shows the GPC ("Gel Permeation Chromatography") curve of the polybutadiene obtained.
Figure 13:
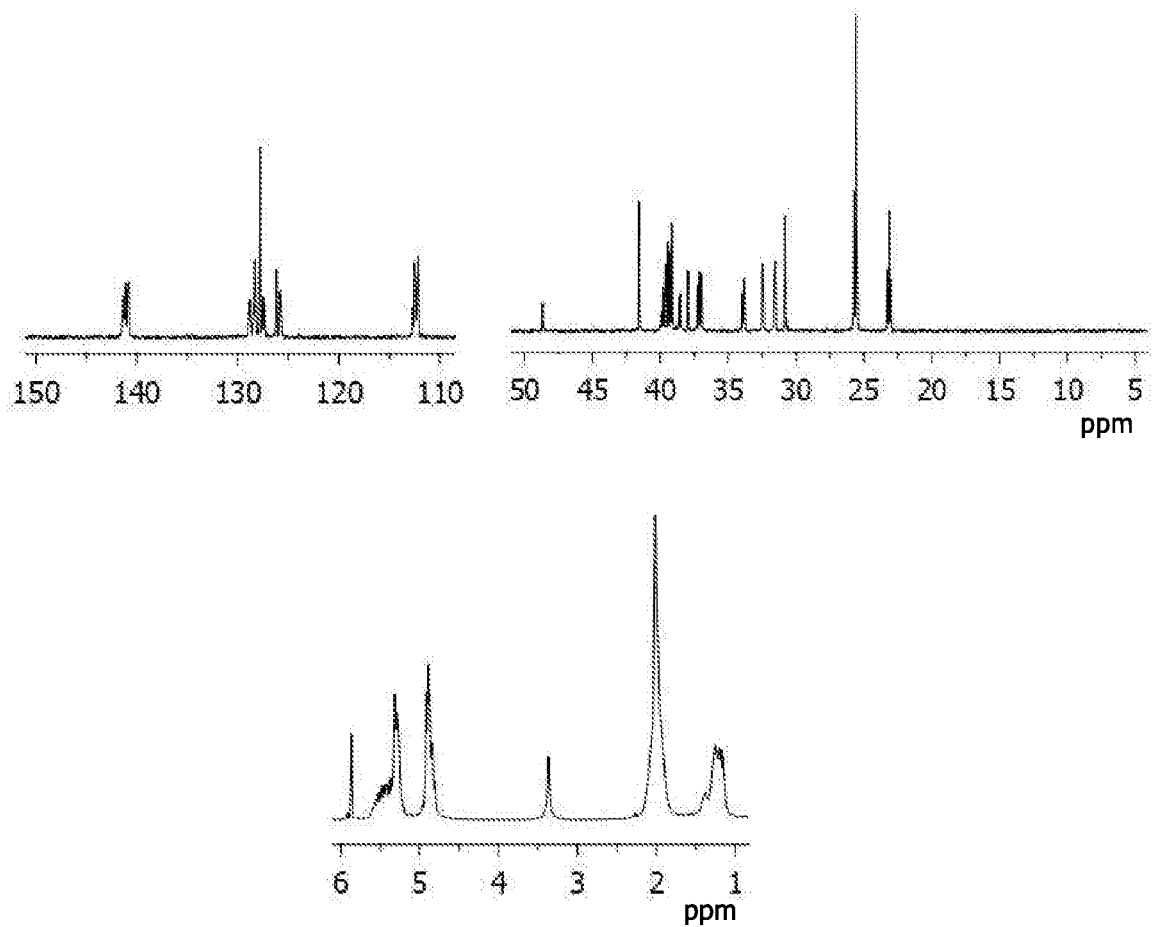
FIG. 13 shows the $^1$H-NMR (top) and $^{13}$C-NMR (bottom) spectra of the polybutadiene obtained.

2 ml of 1,3-butadiene equal to about 1.4 g were condensed, cold (−20° C.) in a 25 ml test tube. Subsequently, 7.3 ml of toluene were added and the temperature of the solution thus obtained was brought to 20° C. Then, methylaluminoxane (MAO) in toluene solution (6.3 ml; $1 \times 10^{-2}$ moles, equal to about 0.58 g) was added and, subsequently, the $FeCl_2(L1)_2$ complex [sample MG110] (2.4 ml of toluene solution at a concentration equal to 2 mg/ml; $1 \times 10^{-5}$ moles, equal to about 4.8 mg) obtained as described in Example 7. The whole was kept under magnetic stirring, at ambient temperature, for 3 minutes. The polymerization was then stopped by adding 2 ml of methanol containing some drops of hydrochloric add. The polymer obtained was then coagulated by adding 40 ml of a methanol solution containing 4% of Irganox® 1076 antioxidant (Ciba) obtaining 1.4 g of polybutadiene having a mixed 1,4-cis/1,2 structure: further characteristics of the process and of the polybutadiene obtained are reported in Table 1.

Figure 14:
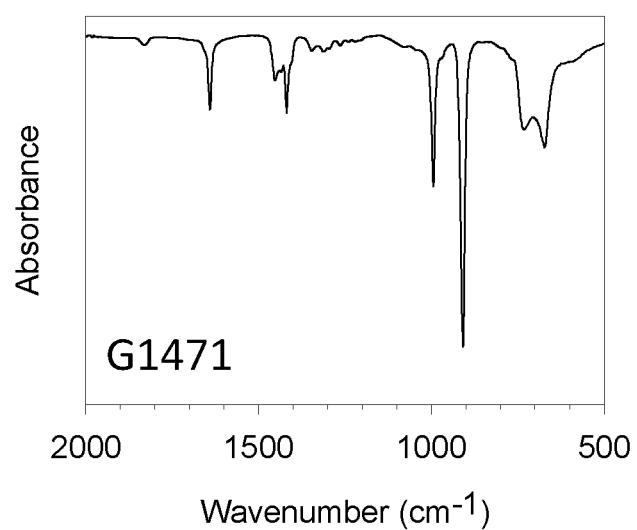

FIG. 14 shows the FT-IR spectrum of the polybutadiene obtained.

Figure 15:
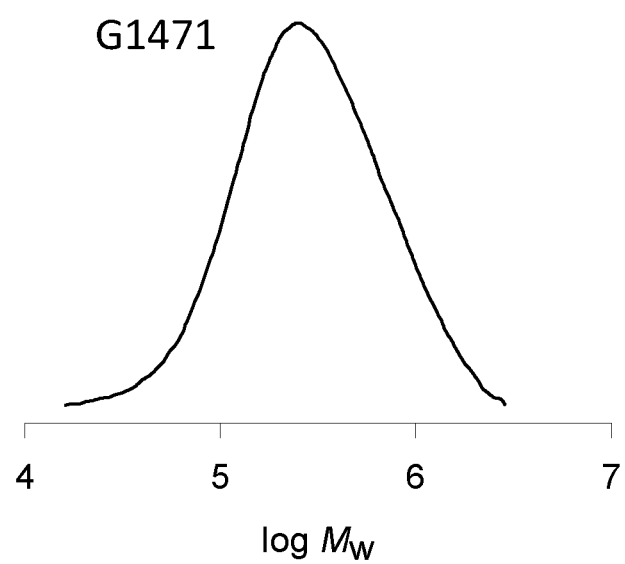

FIG. 15 shows the GPC ("Gel Permeation Chromatograph") curve of the polybutadiene obtained.

Figure 16:
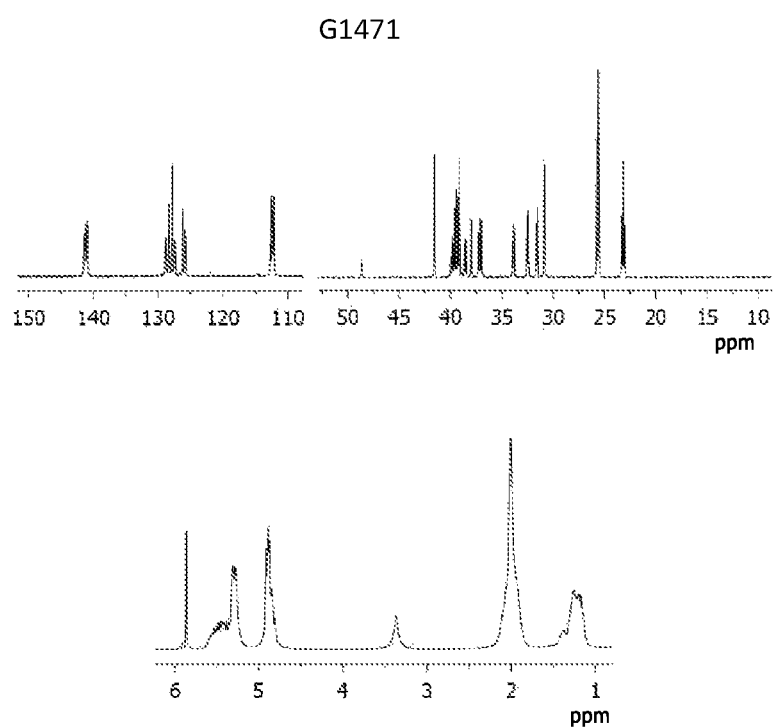

FIG. 16 shows the $^1$H-NMR (top) and $^{13}$C-NMR (bottom) spectra of the polybutadiene obtained.

Example 18 (G1474)

2 ml of 1,3-butadiene equal to about 1.4 g were condensed, cold (−20° C.) in a 25 ml test tube. Subsequently, 10.45 ml of toluene were added and the temperature of the solution thus obtained was brought to −50° C. Then, methylaluminoxane (MAO) in toluene solution (3.15 ml; $5 \times 10^{-3}$ moles, equal to about 0.29 g) was added and, subsequently, the $FeCl_2(L1)_2$ complex [sample MG110] (2.4 ml of toluene solution at a concentration equal 2 mg/ml; $1 \times 10^{-5}$ moles, equal to about 4.6 mg) obtained as described in Example 7. The whole was kept under magnetic stirring, at −50° C., for 120 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.456 g of polybutadiene having a mixed 1,4-cis/1,2 structure: further characteristics of the process and of the polybutadiene obtained are reported in Table 1.

Figure 17:
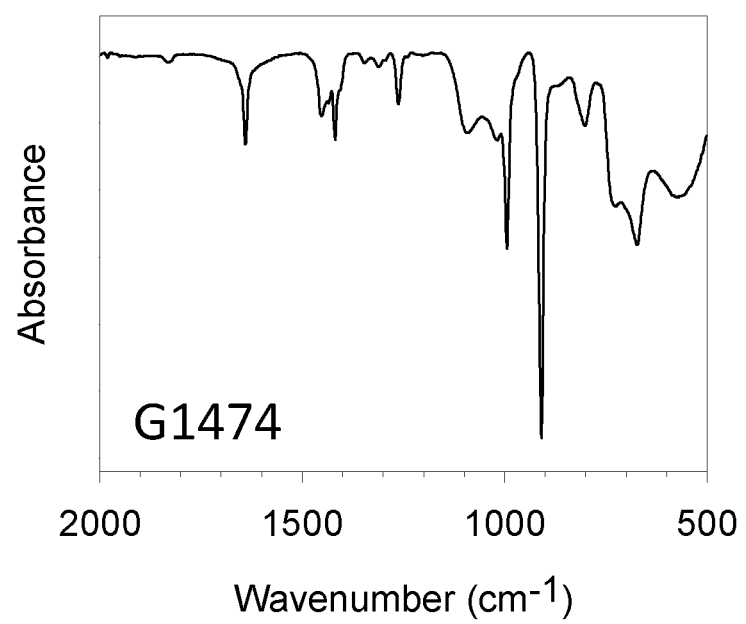

FIG. 17 shows the FT-IR spectrum of the polybutadiene obtained.

Example 19 (IP185)

2 ml of 1,3-butadiene equal to about 1.4 g were condensed, cold (−20° C.) in a 25 ml test tube. Subsequently, 8.1 ml of toluene were added and the temperature of the solution thus obtained was brought to 20° C. Then, methylaluminoxane (MAO) in toluene solution (6.3 ml; $1 \times 10^{-2}$ moles, equal to about 0.58 g) was added and, subsequently, the $FeCl_2(L2)$ complex [sample MG199] (1.6 ml of toluene solution at a concentration equal to 2 mg/ml; $1 \times 10^{-5}$ moles, equal to about 3.15 mg) obtained as described in Example 8. The whole was kept under magnetic stirring, at ambient temperature, for 120 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.580 g of polybutadiene having a mixed 1,4-cis/1,2 structure: further characteristics of the process and of the polybutadiene obtained are reported in Table 1.

Figure 18:
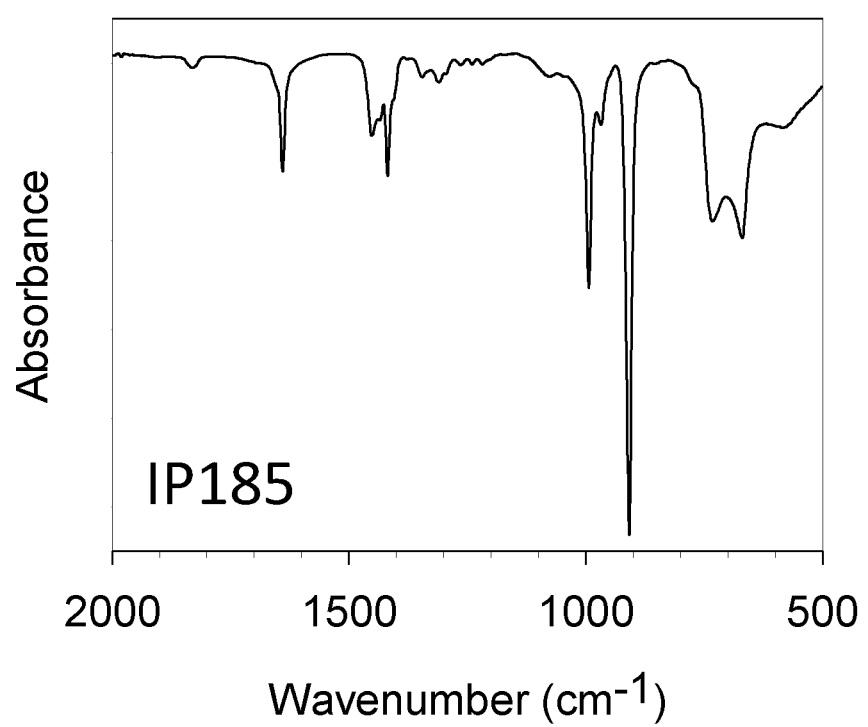

FIG. 18 shows the FT-IR spectrum of the polybutadiene obtained.

Example 20 (IP180)

2 ml of 1,3-butadiene equal to about 1.4 g were condensed, cold (−20° C.) in a 25 ml test tube. Subsequently, 7.2 ml of toluene were added and the temperature of the solution thus obtained was brought to 20° C. Then, methylaluminoxane (MAO) in toluene solution (6.3 ml; $1 \times 10^{-2}$ moles, equal to about 0.58 g) was added and, subsequently, the $FeCl_2(L2)_2$ complex [sample MG114] (2.5 ml of toluene solution at a concentration equal to 2 mg/ml; $1 \times 10^{-5}$ moles, equal to about 5.05 mg) obtained as described in Example 9. The whole was kept under magnetic stirring, at ambient temperature, for 120 minutes. The polymerization was then stopped by adding 2 ml of methanol containing some drops of hydrochloric add. The polymer obtained was then coagulated by adding 40 ml of a methanol solution containing 4% of Irganox® 1076 antioxidant (Ciba) obtaining 1.028 g of polybutadiene having a mixed 1,4-cis/1,2 structure: further characteristics of the process and of the polybutadiene obtained are reported in Table 1.

Example 21 (IP186)

2 ml of 1,3-butadiene equal to about 1.4 g were condensed, cold (−20° C.) in a 25 ml test tube. Subsequently, 8.1 ml of toluene were added and the temperature of the solution thus obtained was brought to 20° C. Then, methylaluminoxane (MAO) In toluene solution (6.3 ml; $1 \times 10^{-2}$ moles, equal to about 0.58 g) was added and, subsequently, the $FeCl_2(L3)$ complex [sample MG101] (1.6 ml of toluene solution at a concentration equal to 2 mg/ml; $1 \times 10^{-6}$ moles, equal to about 3.15 mg) obtained as described in Example 10. The whole was kept under magnetic stirring, at ambient temperature, for 120 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.438 g of polybutadiene having a mixed 1,4-cis/1,2 structure: further characteristics of the process and of the polybutadiene obtained are reported in Table 1.

Figure 19:
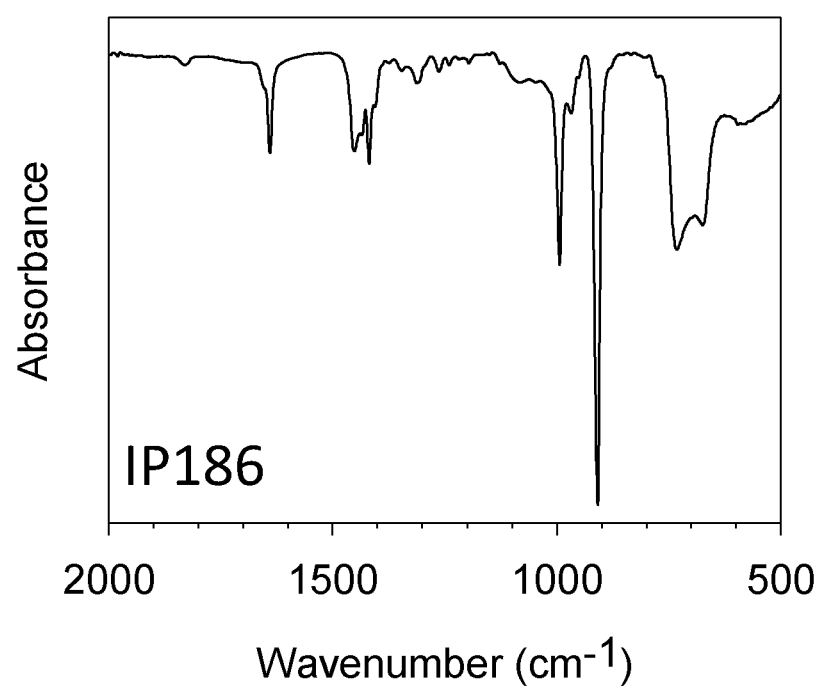

FIG. 19 shows the FT-IR spectrum of the polybutadiene obtained.

Example 22 (IP140)

2 ml of 1,3-butadiene equal to about 1.4 g were condensed, cold (−20° C.) in a 25 ml test tube. Subsequently, 7.2 ml of toluene were added and the temperature of the solution thus obtained was brought to 20° C. Then, methylaluminoxane (MAO) in toluene solution (6.3 ml; $1\times10^{-2}$ moles, equal to about 0.58 g) was added and, subsequently, the $FeCl_2(L3)_2$ complex [sample MG137] (2.5 ml of toluene solution at a concentration equal to 2 mg/ml; $1\times10^{-5}$ moles, equal to about 5.05 mg) obtained as described in Example 11. The whole was kept under magnetic stirring, at ambient temperature, for 480 minutes. The polymerization was then stopped by adding 2 ml of methanol containing some drops of hydrochloric add. The polymer obtained was then coagulated by adding 40 ml of a methanol solution containing 4% of Irganox® 1076 antioxidant (Ciba) obtaining 0.262 g of polybutadiene having a mixed 1,4-cis/1,4-trans/1,2 structure: further characteristics of the process and of the polybutadiene obtained are reported in Table 1.

Figure 20:
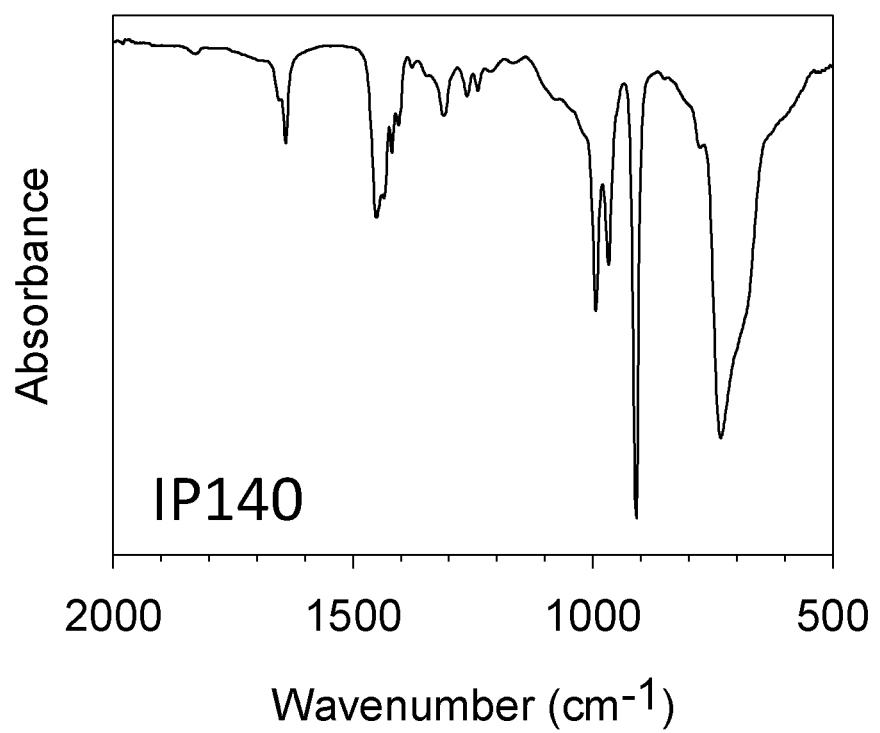

FIG. 20 shows the FT-IR spectrum of the polybutadiene obtained.

Figure 21:
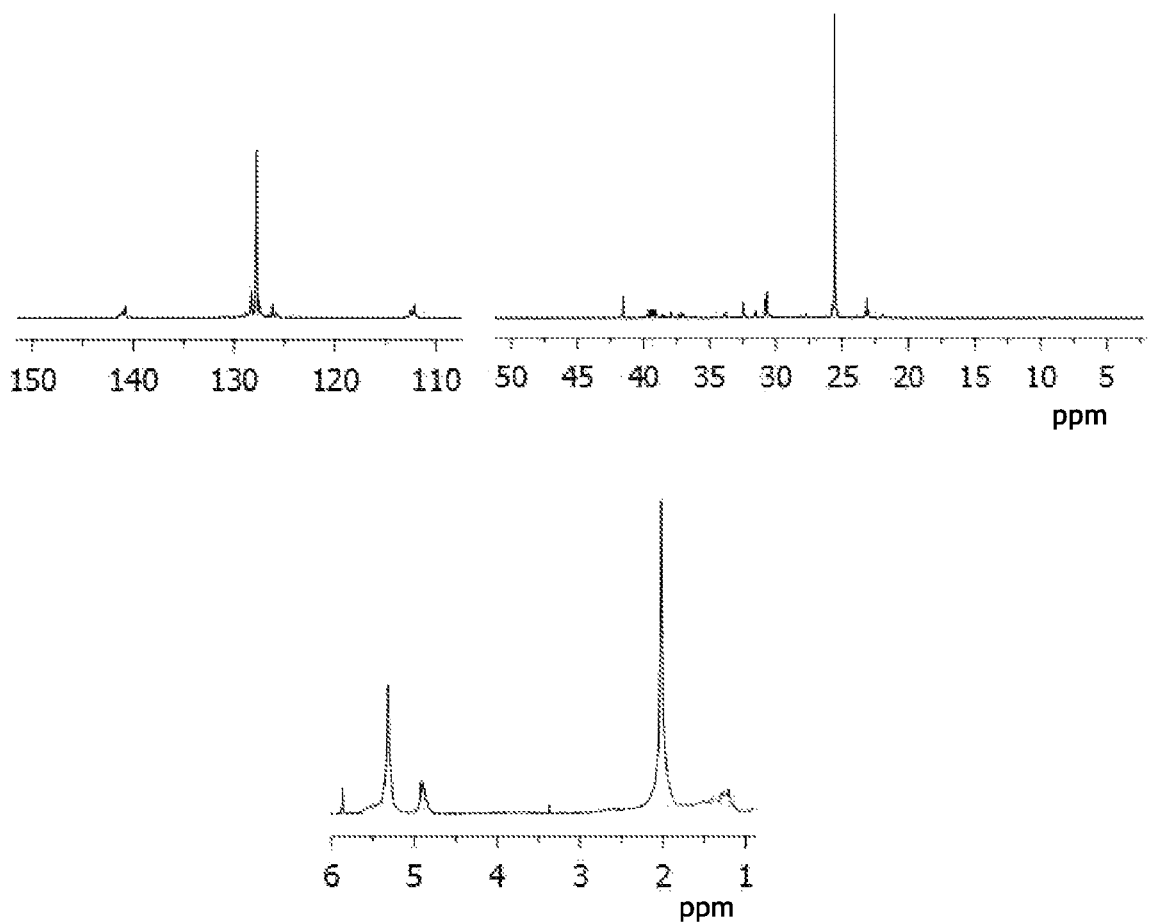

FIG. 21 shows the $^1$H-NMR (top) and $^{13}$C-NMR (bottom) spectra of the polybutadiene obtained.

Example 23 (IP184)

2 ml of 1,3-butadiene equal to about 1.4 g were condensed, cold (−20° C.) in a 25 ml test tube. Subsequently, 7.8 ml of toluene were added and the temperature of the solution thus obtained was brought to 20° C. Then, methylaluminoxane (MAO) In toluene solution (6.3 ml; $1\times10^{-2}$ moles, equal to about 0.58 g) was added and, subsequently, the $FeCl_2(L4)$ complex [sample MG201] (1.9 ml of toluene solution at a concentration equal to 2 mg/ml; $1\times10^{-5}$ moles, equal to about 3.85 mg) obtained as described in Example 12. The whole was kept under magnetic stirring, at ambient temperature, for 5760 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.331 g of polybutadiene having a mixed 1,4-cis/1,4-trans/1,2 structure: further characteristics of the process and of the polybutadiene obtained are reported in Table 1.

Figure 22:
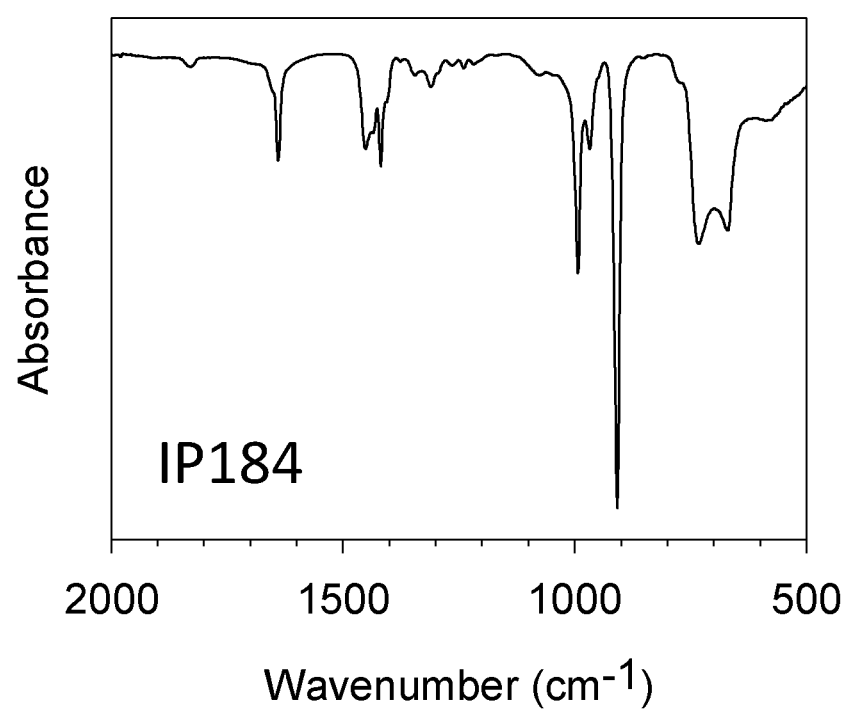

FIG. 22 shows the FT-IR spectrum of the polybutadiene obtained.

Example 24 (IP141)

2 ml of 1,3-butadiene equal to about 1.4 g were condensed, cold (20° C.) in a 25 ml test tube. Subsequently, 6.5 ml of toluene were added and the temperature of the solution thus obtained was brought to 20° C. Then, methylaluminoxane (MAO) In toluene solution (6.3 ml; $1\times10^{-2}$ moles, equal to about 0.58 g) was added and, subsequently, the $FeCl_2(L4)_2$ complex [sample MG145] (3.2 ml of toluene solution at a concentration equal to 2 mg/ml; $1\times10^{-5}$ moles, equal to about 6.46 mg) obtained as described in Example 13. The whole was kept under magnetic stirring, at ambient temperature, for 180 minutes.

The polymerization was then stopped by adding 2 ml of methanol containing some drops of hydrochloric add. The polymer obtained was then coagulated by adding 40 ml of a methanol solution containing 4% of Irganox® 1076 antioxidant (Ciba) obtaining 0.561 g of polybutadiene having a mixed 1,4-cis/1,4-trans/1,2 structure: further characteristics of the process and of the polybutadiene obtained are reported in Table 1.

Figure 23:
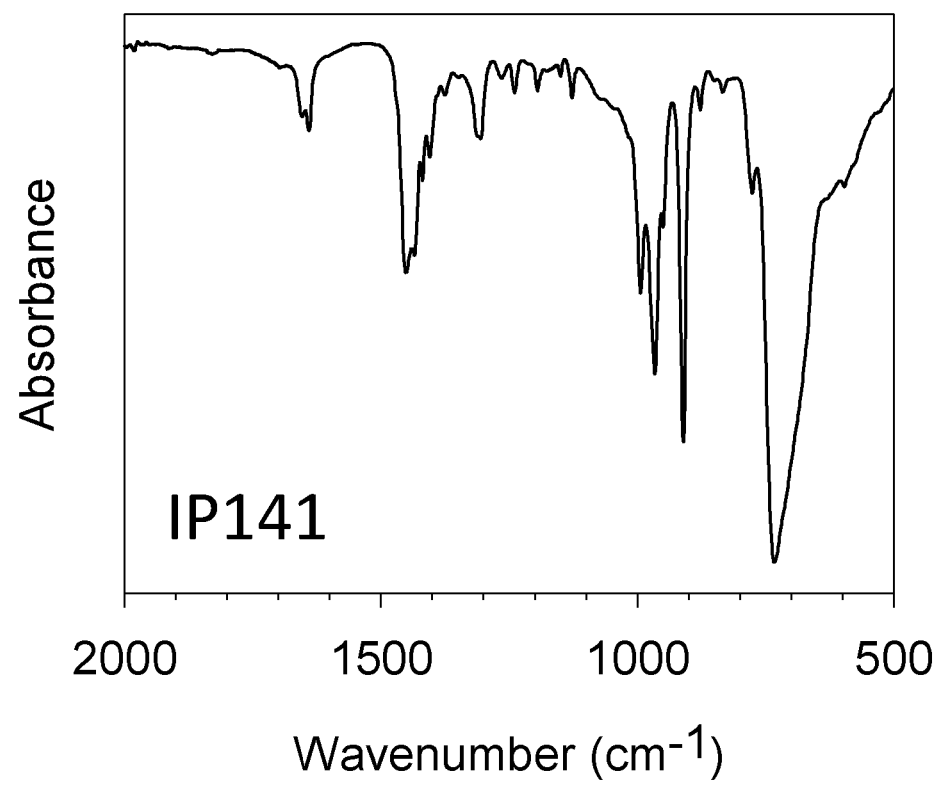

FIG. 23 shows the FT-IR spectrum of the polybutadiene obtained.

Figure 24:
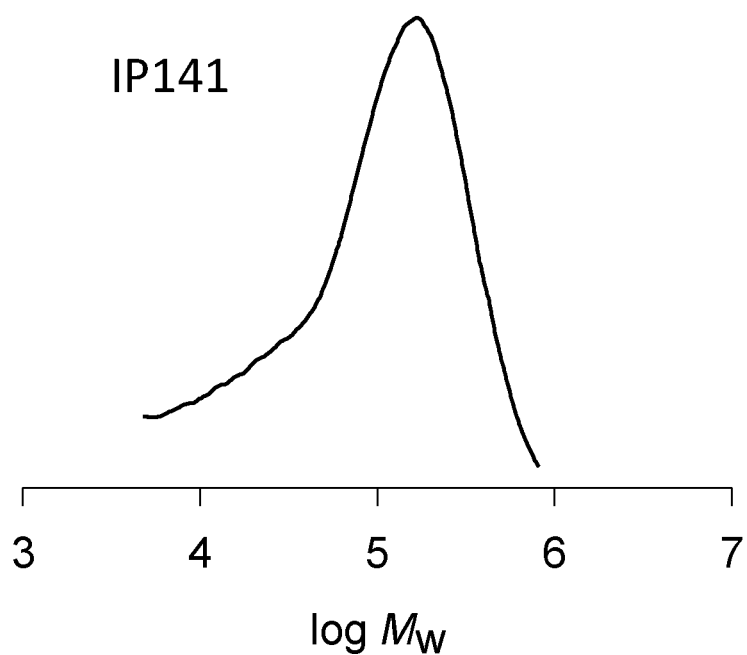

FIG. 24 shows the GPC ("Gel Permeation Chromatography") curve of the polybutadiene obtained.

Example 25 (G1472)

2 ml of 1,3-butadiene equal to about 1.4 g were condensed, cold (−20° C.) in a 25 ml test tube. Subsequently, 7.98 ml of toluene were added and the temperature of the solution thus obtained was brought to 20° C. Then, methylaluminoxane (MAO) in toluene solution (6.3 ml; $1\times10^{-2}$ moles, equal to about 0.58 g) was added and, subsequently, the $FeCl_2(L5)$ complex [sample MG102] (1.72 ml of toluene solution at a concentration equal to 2 mg/ml; $1\times10^{-5}$ moles, equal to about 3.43 mg) obtained as described in Example 14. The whole was kept under magnetic stirring, at ambient temperature, for 5760 minutes. The polymerization was then stopped by adding 2 ml of methanol containing some drops of hydrochloric add. The polymer obtained was then coagulated by adding 40 ml of a methanol solution containing 4% of Irganox® 1076 antioxidant (Ciba) obtaining 0.290 g of polybutadiene having a mixed 1,4-cis/1,4-trans/1,2 structure. Further characteristics of the process and of the polybutadiene obtained are reported in Table 1.

Figure 25:
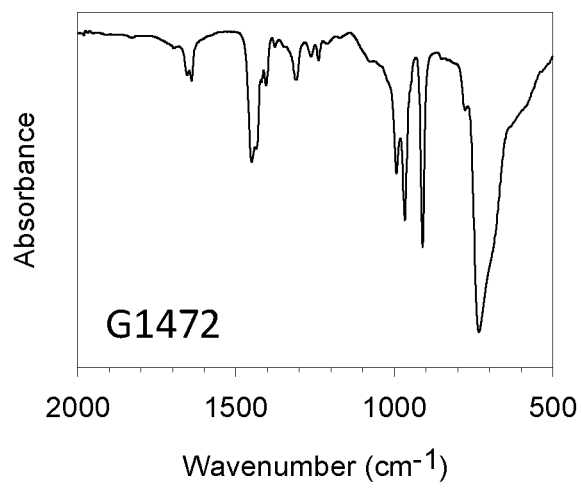

FIG. 25 shows the FT-IR spectrum of the polybutadiene obtained.

Example 26 (G1473)

2 ml of 1,3-butadiene equal to about 1.4 g were condensed, cold (−20° C.) in a 25 ml test tube. Subsequently, 6.89 ml of toluene were added and the temperature of the solution thus obtained was brought to 20° C. Then, methylaluminoxane (MAO) in toluene solution (6.3 ml; $1\times10^{-2}$ moles, equal to about 0.58 g) was added and, subsequently, the $FeCl_2(L5)_2$ complex [sample MG112] (2.8 ml of toluene solution at a concentration equal to 2 mg/ml; $1\times10^{-5}$ moles, equal to about 5.6 mg) obtained as described in Example 15. The whole was kept under magnetic stirring, at ambient temperature, for 390 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.417 g of polybutadiene having a mixed 1,4-cis/1,2 structure: further characteristics of the process and of the polybutadiene obtained are reported in Table 1.

Figure 26:
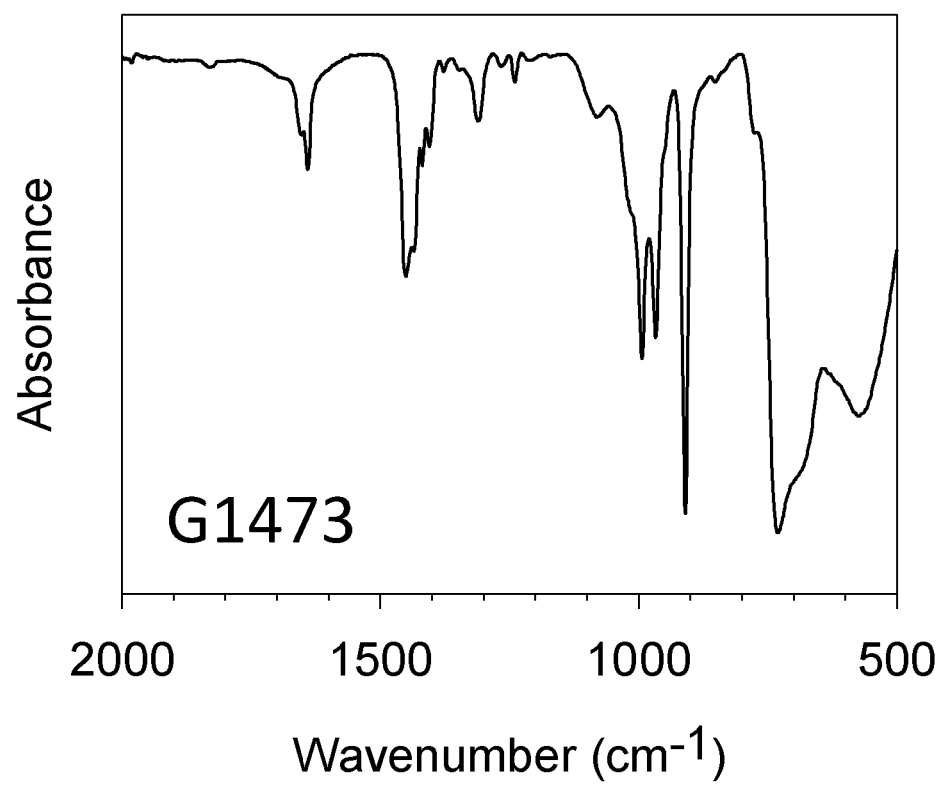

FIG. 26 shows the FT-IR spectrum of the polybutadiene obtained.

Figure 27:
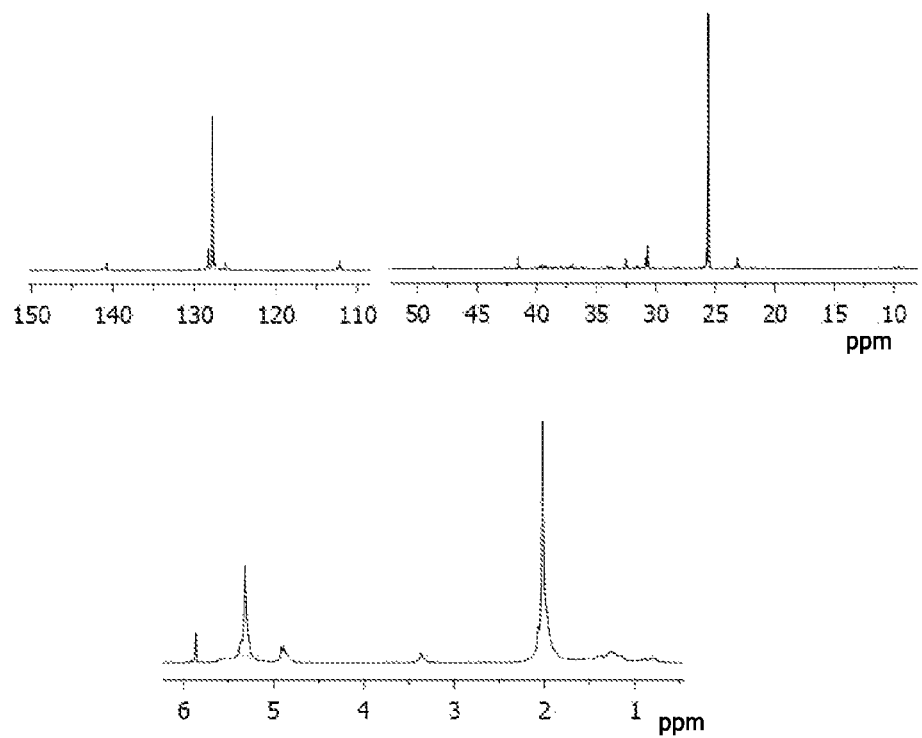

FIG. 27 shows the $^1$H-NMR (top) and $^{13}$C-NMR (bottom) spectra of the polybutadiene obtained.

Example 27 (IP126)

7.3 ml of toluene were inserted into a 25 ml test tube and, subsequently, 2 ml of isoprene equal to about 1.36 g. Then methylaluminoxane (MAO) in toluene solution (6.3 ml; $1\times10^{-2}$ moles, equal to about 0.58 g) was added and, subsequently, the $FeCl_2(L1)_2$ complex [sample MG110] (2.48 ml of toluene solution at a concentration equal to 2 mg/ml; $1\times10^{-5}$ moles, equal to about 4.8 mg) obtained as described in Example 7. The whole was kept under magnetic stirring, at ambient temperature, for 180 minutes. The polymerization was then stopped by adding 2 ml of methanol containing some drops of hydrochloric add. The polymer obtained was then coagulated by adding 40 ml of a methanol solution containing 4% of Irganox® 1076 antioxidant (Ciba) obtaining 0.553 g of polyisoprene having a mixed 1,4-cis/3,4 structure: further characteristics of the process and of the polyisoprene obtained are reported in Table 2.

Figure 28:
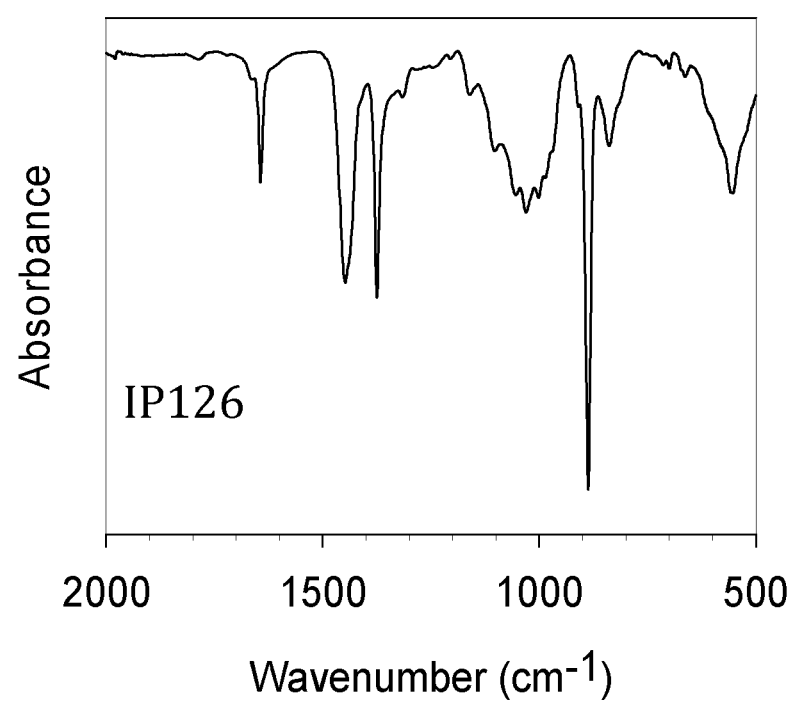

FIG. 28 shows the FT-IR spectrum of the polyisoprene obtained.

Example 28 (IP143)

6.5 ml of toluene were inserted into a 25 ml test tube, at ambient temperature, and, subsequently, 2 ml of isoprene equal to about 1.36 g. Then methylaluminoxane (MAO) in toluene solution (6.3 ml; $1 \times 10^{-2}$ moles, equal to about 0.58 g) was added and, subsequently, the $FeCl_2(L4)_2$ complex [sample MG145] (3.2 ml of toluene at a concentration equal to 2 mg/ml; $1 \times 10^{-5}$ moles, equal to about 6.4 mg) obtained as described in Example 13. The whole was kept under magnetic stirring, at ambient temperature, for 600 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 0.502 g of polyisoprene having a mixed 1,4-cis/3,4 structure: further characteristics of the process and of the polyisoprene obtained are reported in Table 2.

Figure 29:
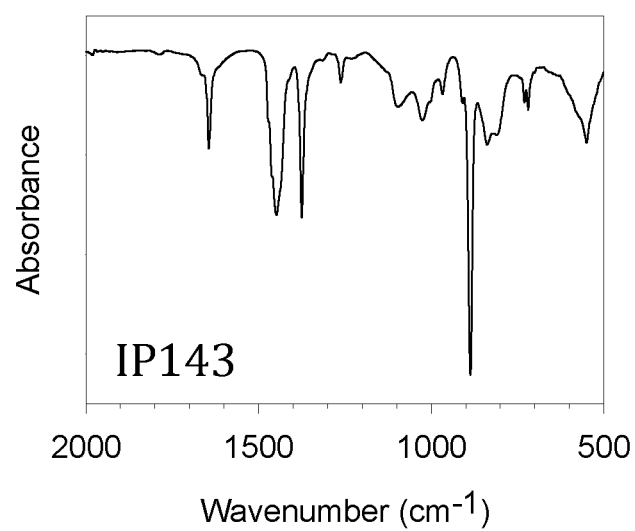

FIG. 29 shows the FT-IR spectrum of the polyisoprene obtained.

TABLE 1

Polymerization of 1,3-butadiene with catalytic systems comprising iron complexes

| Example | Time (min) | Conversion (%) | 1,4-cis (%) | 1,4-trans (%) | 1.2 (%) | $M_w$ (gxmol$^{-1}$) | $M_w/M_n$ |
|---|---|---|---|---|---|---|---|
| 16 | 3 | 53.9 | 46.6 | 0 | 53.4 | 575000 | 2.0 |
| 17 | 3 | 100 | 44.3 | 0 | 55.7 | 402000 | 1.9 |
| 18 | 120 | 32.1 | 47.5 | 0 | 52.5 | 818000 | 2.1 |
| 19 | 120 | 41.4 | 46.1 | 0 | 53.9 | 560500 | 2.1 |
| 20 | 120 | 73.4 | 49.7 | 0 | 50.3 | 455000 | 1.8 |
| 21 | 1210 | 31.3 | 53.5 | 0 | 46.5 | 492000 | 2.0 |
| 22 | 480 | 18.7 | 51.6 | 4 | 44.4 | 344000 | 1.9 |
| 23 | 5760 | 23.6 | 75.7 | 4.9 | 19.4 | 297500 | 2.2 |
| 24 | 180 | 40.1 | 81.0 | 6.9 | 12.1 | 154500 | 2.1 |
| 25 | 5760 | 20.7 | 80.6 | 7.1 | 12.3 | 283000 | 2.2 |
| 26 | 390 | 29.8 | 80.1 | 0 | 19.9 | 164500 | 2.1 |

TABLE 2

Polymerization of isoprene with catalytic systems comprising iron complexes

| Example | Time (min) | Conversion (%) | 1,4-cis (%) | 1,4-trans (%) | 3.4 (%) | $M_w$ (gxmol$^{-1}$) | $M_w/M_n$ |
|---|---|---|---|---|---|---|---|
| 27 | 180 | 40.7 | 39.4 | 0 | 60.6 | 175000 | 2.0 |
| 28 | 600 | 36.9 | 33.5 | 0 | 66.5 | 97500 | 1.9 |

The invention claimed is:

1. A catalytic system for the (co)polymerization of conjugated dienes comprising:
   a) at least one oxo-nitrogenated iron complex having general formula (I) or (II):

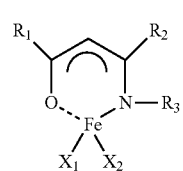

(I)

wherein:
   each of $R_1$ and $R_2$;
   $R_3$ is an unsubstituted phenyl group; and
   each of $X_1$ and $X_2$ is a chlorine atom; and
   b) at least one co-catalyst selected from organic compounds of an element M' different from carbon, said element M' being selected from elements belonging to groups 2, 12, 13, or 14 of the Periodic Table of the Elements.

2. The catalytic system for the (co)polymerization of conjugated dienes according to claim 1, wherein said co-catalyst (b) is selected from ($b_1$) aluminum alkyls having general formula (III):

$$Al(X')_n(R_5)_{3-n} \qquad (III)$$

wherein said element M' different from carbon includes said Al atom, X' represents a halogen atom; $R_5$ is selected from linear or branched $C_1$-$C_{20}$ alkyl groups, cycloalkyl groups, or aryl groups, said groups being optionally substituted with one or more atoms of silicon or germanium; and n is an integer ranging from 0 to 2.

3. The catalytic system for the (co)polymerization of conjugated dienes according to claim 2, wherein said aluminum alkyls ($b_1$) having general formula (III) are di-ethyl-aluminum chloride (DEAC), mono-ethyl-aluminum dichloride (EADC), or ethyl aluminum-sesquichloride (EASC).

4. The catalytic system for the (co)polymerization of conjugated dienes according to claim 1, wherein said co-catalyst (b) is selected from ($b_2$) organo-oxygenated compounds of said element M' different from carbon belonging to groups 13 or 14 of the Periodic Table of Elements.

5. The catalytic system for the (co) polymerization of conjugated dienes according to claim 4, wherein said organo-oxygenated compounds ($b_2$) are selected from aluminoxanes having general formula (IV):

$$(R_6)_2\text{—Al—O—}[\text{—Al}(R_7)\text{—O—}]_p\text{—Al—}(R_8)_2 \qquad (IV)$$

wherein said element M' different from carbon includes said Al atoms, $R_6$, $R_7$ and $R_8$, identical or different, represent a hydrogen atom, a halogen atom; or are selected from linear or branched $C_1$-$C_{20}$ alkyl groups, cycloalkyl groups, or aryl groups, said groups being optionally substituted with one or more atoms of silicon or germanium; and p is an integer ranging from 0 to 1000.

6. The catalytic system for the (co)polymerization of conjugated dienes according to claim 5, wherein said organo-oxygenated compound ($b_2$) is methylaluminoxane (MAO).

7. The catalytic system for the (co)polymerization of conjugated dienes according to claim 1, wherein said co-catalyst (b) is selected from ($b_3$) compounds or mixtures of organometallic compounds of said element M' different from carbon able to react with the oxo-nitrogenated iron complex having general formula (I), extracting from this a σ-linked substituent $X_1$ or $X_2$, to form on the one hand at least one neutral compound, and on the other hand an ionic compound consisting of a cation containing the metal (Fe) coordinated by the ligand, and an organic non-coordinating anion containing the metal M', whose negative charge is delocalized on a multicentric structure.

8. The catalytic system for the (co)polymerization of conjugated dienes according to claim 7, wherein said compounds or mixtures of compounds ($b_3$) are selected from organic compounds of aluminum or boron, including those represented by the following general formulae:

$[(R_C)_w H_{4-w}]\cdot[B(R_D)_4]$—; $B(R_D)_3$; $Al(R_D)_3$; $B(R_D)_3$ Pyr; $[Ph_3C]+\cdot[B(R_D)_4]$—;

$[(R_C)_3 PyrH]+\cdot[B(R_D)_4]$—;

$[Li]+\cdot[B(R_D)_4]$—; $[Li]+\cdot[Al(R_D)_4]$— wherein said element M' different from carbon includes said Al atom or said B atom, w is an integer ranging from 0 to 3, each $R_C$ group independently represents an alkyl group or an aryl group having from 1 to 10 carbon atoms and each RD group independently represents an aryl group partially or totally fluorinated, having from 6 to 20 carbon atoms, and Pyr represents a pyrrolyl radical optionally substituted.

9. The catalytic system for the (co) polymerization of conjugated dienes comprising:
at least one said oxo-nitrogenated iron complex having the general formula (I) as claimed in claim 1 wherein said element M' different from carbon is selected from: boron, aluminum, zinc, magnesium, gallium, or tin.

10. A (co)polymerization process, wherein the catalytic system according to claim 1 is used to (co)polymerize conjugated dienes.

11. The (co)polymerization process according to claim 10, wherein said conjugated dienes are 1,3-butadiene or isoprene.

* * * * *